US012596919B2

(12) United States Patent
Sanchez et al.

(10) Patent No.: US 12,596,919 B2
(45) Date of Patent: Apr. 7, 2026

(54) NEURAL NETWORK ACCELERATOR WITH A CONFIGURABLE PIPELINE

(71) Applicant: Imagination Technologies Limited, Kings Langley (GB)

(72) Inventors: Javier Sanchez, Hertfordshire (GB); Alan Vines, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 790 days.

(21) Appl. No.: 17/957,044

(22) Filed: Sep. 30, 2022

(65) Prior Publication Data

US 2023/0177320 A1 Jun. 8, 2023

(30) Foreign Application Priority Data

Sep. 30, 2021 (GB) ...................................... 2114047
Sep. 30, 2021 (GB) ...................................... 2114049
Sep. 30, 2021 (GB) ...................................... 2114052

(51) Int. Cl.
| | |
|---|---|
| *G06N 3/063* | (2023.01) |
| *G06F 9/50* | (2006.01) |
| *G06N 3/0464* | (2023.01) |
| *G06N 3/048* | (2023.01) |

(52) U.S. Cl.
CPC ........... *G06N 3/063* (2013.01); *G06F 9/5027* (2013.01); *G06N 3/0464* (2023.01); *G06N 3/048* (2023.01)

(58) Field of Classification Search
CPC ...... G06N 3/063; G06N 3/0464; G06N 3/048; G06N 3/045; G06F 9/5027
See application file for complete search history.

(56) References Cited

U.S. PATENT DOCUMENTS

| | | | |
|---|---|---|---|
| 11,250,107 B2 * | 2/2022 | Piveteau | ................ G06N 3/084 |
| 2018/0189649 A1 | 7/2018 | Narayan et al. | |
| 2020/0026992 A1 | 1/2020 | Zhang et al. | |
| 2020/0410327 A1 | 12/2020 | Chinya et al. | |

OTHER PUBLICATIONS

Zhang, SARA: Scaling a Reconfigurable Dataflow Accelerator, pp. 1041-1043, Jul. (Year: 2021).*

(Continued)

*Primary Examiner* — Albert M Phillips, III

(74) *Attorney, Agent, or Firm* — Potomac Law Group, PLLC; Vincent M DeLuca

(57) ABSTRACT

A neural network accelerator that has a configurable hardware pipeline includes a plurality of hardware processing units, each hardware processing unit comprising hardware to accelerate performing one or more neural network operations on a tensor of data; and a crossbar coupled to each hardware processing unit of the plurality of hardware processing units, the crossbar configured to selectively form, from a plurality of selectable pipelines, a pipeline from one or more of the hardware processing units of the plurality of hardware processing units to process input data to the neural network accelerator. At least one of the hardware processing units is configurable to transmit or receive a tensor via the crossbar in a selected processing order of a plurality of selectable processing orders, and the selected processing order is based on the pipeline formed by the crossbar.

20 Claims, 20 Drawing Sheets

INPUT DATA    LAYER 1          LAYER 2          LAYER 3   OUTPUT DATA

(56) References Cited

OTHER PUBLICATIONS

Venkatesan, MAGNet: A Modular Accelerator Generator for Neural Networks, pp. 1-8 (Year: 2019).*

Nagel et al; "A White Paper on Neural Network Quantization"; Arxiv.org, Cornell University Library; Jun. 15, 2021; pp. 1-27.

Wu et al; "Data Locality Optimization of Depthwise Separable Convolutions for CNN Inference Accelerators"; 2019 Design, Automation & Test in Europe Conference & Exhibition (Date); Mar. 25, 2019; pp. 120-125.

Zhan et al; "Field programmable gate array-based all-layer accelerator with quantization neural networks for sustainable cyber-physical systems"; Retrieved from the Internet: URL:https://onlinelibrary.wiley.com/doi/full-xml/10.1002/spe.2938>; vol. 51; No. 11; Dec. 3, 2020; pp. 2203-2224.

Kwon et al, "MAERI: Enabling Flexible Dataflow Mapping over DNN Accelerators via Reconfigurable Interconnects," Architectural Support for Programming Languages and Operating Systems, 2018, pp. 461-475, abstract; Sections 1-6 and 8; figures 1, 4-10, 17(b).

Wu et al, "A Reconfigurable Convolutional Neural Network-Accelerated Coprocessor Based on RISC-V Instruction Set", Electronics, vol. 9, 2020, pp. 1-19 URL: https://www.mdpi.com/2079-9292/9/6/1005/pdf?version=1592288494 abstract; Sections 1 and 3-7; figures 4-7, 12-14.

Rivera-Acosta et al, "Automatic Tool for Fast Generation of Custom Convolutional Neural Networks Accelerators for FPGA", Electronics [Online], vol. 8, 2019, pp. 1-17 URL: https://www.mdpi.com/2079-9292/8/6/641/pdf?version= 15598222230 abstract, Sections 1-6; figures 6, 7-14.

Kwon et al; "MAERI: Enabling Flexible Dataflow Mapping over DNN Accelerators via Reconfigurable Interconnects"; Architectural Support for Programming Languages and Operating Systems; Mar. 19, 2018; pp. 461-475.

* cited by examiner

1200

1700

1702

OBTAIN SEQUENCE OF
NEURAL NETWORK
OPERATIONS

1704

SELECT SET OF HARDWARE
PROCESSING UNITS TO
PERFORM NEURAL NETWORK
OPERATIONS

1706

DETERMINE ORDER OF
SELECTED SET OF
HARDWARE PROCESSING
UNITS

1708

PROVIDE CONTROL
INFORMATION TO CAUSE NN
ACCELERATOR TO FORM
PIPELINE OF SET IN
DETERMINED ORDER

NEURAL NETWORK ACCELERATOR WITH A CONFIGURABLE PIPELINE

TECHNICAL FIELD

This application is directed to neural network accelerators.

BACKGROUND

A Deep Neural Network (DNN) is a form of artificial neural network comprising a plurality of interconnected layers that can be used for machine learning applications. In particular, a DNN can be used in signal processing applications, including, but not limited to, image processing and computer vision applications. FIG. 1 illustrates an example DNN 100 that comprises a plurality of layers 102, 104, 106. Each layer 102, 104, 106 receives input data, and processes the input data in accordance with the layer to produce output data. The output data is either provided to another layer as the input data, or is output as the final output data of the DNN. For example, in the DNN 100 of FIG. 1, the first layer 102 receives the original input data 108 to the DNN 100, and processes the input data in accordance with the first layer 102 to produce output data 110. The output data 110 of the first layer 102 becomes the input data to the second layer 104, and the second layer 104 processes the input data 110 in accordance with the second layer 104 to produce output data 112. The output data 112 of the second layer 104 becomes the input data to the third layer 106, and the third layer 106 processes the input data 112 in accordance with the third layer 106 to produce output data 114. The output data 114 of the third layer 106 is then output as the final output data of the DNN. Where the DNN is used for classification, the output data 114 may be a vector of length A, wherein A is the number of classes and each value in the vector represents the probability of a certain class.

The data 200 input to and output from a layer of a DNN can be described as a tensor. As is known to those of skill in the art, a tensor is a generalization of vectors and matrices and can be described as an n-dimensional array. A vector is a one-dimensional tensor, and a matrix is a two-dimensional tensor. The tensors in a DNN are often, but are not necessarily, three-dimensional. Reference is made to FIG. 2 which illustrates an example three-dimensional (3D) tensor 200. The 3D tensor 200 may be described as C planes of data, where each plane has a dimension H×W. Each plane may be referred to as a channel of the tensor. An element of a tensor may be referred to as a tensel, akin to how an element of a picture is referred to as a pixel.

The processing that is performed on the input data to a layer depends on the type of layer. For example, each layer of a DNN may be one of a plurality of different types. Example DNN layer types include, but are not limited to, a convolution layer, an activation layer, a normalisation layer, a pooling layer, and a fully connected layer. It will be evident to a person of skill in the art that these are example DNN layer types and that this is not an exhaustive list and there may be other DNN layer types.

A convolution layer convolves the input data with weights associated with the layer. Specifically, each convolution layer is associated with a plurality of weights $k_0 \ldots k_g$, which may also be referred to as filter weights or coefficients. The weights are grouped to form, or define, one or more filters or kernels, and each filter may be associated with an offset bias bias. Each filter may have a dimension M×N×C (i.e. each filter may comprise a set of M×N×C weights k) and may be applied to the input data according to a convolution operation across steps $s_W$ and $s_H$ in the W and H directions as shown in FIG. 2. The step sizes $s_W$ and $s_H$ may be referred to as the strides of the convolution. The number of filters and/or the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, applies one or more activation functions to the input data to the layer. An activation function receives an input tensor and performs a certain non-linear mathematical operation on each value or element in the input tensor. In other words, the activation function operates on each value or element in the input tensor separately. In some examples, an activation layer may act as rectified linear unit (ReLU) by implementing an ReLU function (i.e. f(x)=max (0,x)) or a Parametric Rectified Linear Unit (PReLU) by implementing a PreLU function.

A normalisation layer is configured to perform a normalising function, such as a Local Response Normalisation (LRN) function on the input data. A pooling layer, which is typically, but not necessarily inserted between successive convolution layers, performs a pooling function, such as a max, min or average function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs a vector of length A. Where the DNN is used for classification, A may be the number of classes, and each value in the vector may represent the probability of a certain class. The vector of length A is generated through a matrix multiplication of a set of weights, optionally followed by a bias offset. A fully connected layer thus receives a set of weights and a bias.

Accordingly, each layer of a DNN receives input data values (e.g. an input tensor) and generates output data values (e.g. an output tensor); and some layers (such as, but not limited to, convolution layers and fully-connected layers) also receive weights and/or biases.

DNNs are often computationally complex to implement. Accordingly, neural network accelerators have been developed that allow neural networks, including DNNs, to be implemented in an efficient manner (e.g. in a manner that requires less silicon area or less processing power).

The embodiments described below are provided by way of example only and are not limiting of implementations which solve any or all of the disadvantages of known neural network accelerators.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are neural network accelerators that have a configurable hardware pipeline. The neural network includes a plurality of hardware processing units, each hardware processing unit comprising hardware to accelerate performing one or more neural network operations on a tensor of data; and a crossbar coupled to each hardware processing unit of the plurality of hardware processing units, the crossbar configured to selectively form, from a plurality of selectable pipelines, a pipeline from one or more of the hardware processing units of the plurality of hardware processing units to process input data to the neural network accelerator. At least one of the hardware processing units is configurable to transmit or receive a tensor via the crossbar in a selected processing order of a plurality of selectable processing orders, and the selected processing order is based on the pipeline formed by the crossbar.

A first aspect provides a neural network accelerator comprising: a plurality of hardware processing units, each hardware processing unit comprising hardware to accelerate performing one or more neural network operations on a tensor of data; and a crossbar coupled to each hardware processing unit of the plurality of hardware processing units, the crossbar configured to selectively form, from a plurality of selectable pipelines, a pipeline from one or more of the hardware processing units of the plurality of hardware processing units to process input data to the neural network accelerator; wherein at least one of the hardware processing units is configurable to transmit or receive a tensor via the crossbar in a selected processing order of a plurality of selectable processing orders, and the selected processing order is based on the pipeline formed by the crossbar.

Each tensor may comprise a plurality of dimensions, and each processing order may define a sequence across the tensor dimensions in which data elements of the tensor are received or transmitted.

Each tensor may comprise a width dimension, a height dimension and a channel dimension, and the plurality of selectable processing orders may comprise a back end processing order in which data elements of the tensor are received or transmitted in width order, channel order and height order on a block basis, each block comprising elements of the tensor at a same height and a same width.

Each tensor may comprise a width dimension, a height dimension and a channel dimension, and the plurality of selectable processing orders may comprise a normalisation partial back end processing order in which data elements of the tensor are received or transmitted in a width order up to a maximum number of widths, channel order and height order on a block basis, each block comprising elements of the tensor at a same height and a same width.

Each tensor may comprise a width dimension, a height dimension and a channel dimension, and the plurality of selectable processing orders may comprise a front end processing order in which data elements of the tensor are received or transmitted in channel, width and height order on a block basis, each block comprising elements of the tensor in a same channel and at a same height.

Each tensor may comprise a width dimension, a height dimension and a channel dimension, and the plurality of selectable processing orders may comprise a rasterized front end processing order in which data elements of the tensor are received or transmitted in channel order, width order and height order on a block basis, each block comprising data elements of the tensor in a same channel and one or two height positions.

Each block may have a maximum number of data elements, the maximum number of data elements being equal to a maximum number of data elements that can be received on an input port of the crossbar or transmitted on an output port of the crossbar at a same time.

The plurality of hardware processing units may comprise a convolution processing unit configured to accelerate a convolution operation between input data and weight data, the convolution processing unit comprising one or more convolution engines; and the maximum number of data elements that can be received on an input port of the crossbar or transmitted on an output port of the crossbar at the same time may be equal to the number of convolution engines.

The neural network accelerator may be configured to process a neural network in a plurality of hardware passes of the neural network accelerator, wherein, in a hardware pass of the neural network accelerator, the neural network accelerator is configured to load input data into the neural network accelerator and process the input data via a pipeline of the plurality of selectable pipelines; and the crossbar may be configured to receive, in a hardware pass, information identifying which pipeline of the plurality of selectable pipelines is to be formed in that hardware pass and information identifying the selected processing order for the at least one hardware processing unit.

The crossbar may comprise a plurality of input ports and a plurality of output ports, and the information identifying which pipeline of the plurality of selectable pipelines is to be formed in a hardware pass may identify which input ports of the crossbar are to be connected to which output ports of the crossbar.

The crossbar may comprise a plurality of input ports and a plurality of output ports, the information identifying which pipeline of the plurality of pipelines is to be formed in a hardware pass may identify the hardware processing units of the plurality of hardware processing units forming the pipeline and the order of those hardware processing units in the pipeline, and the crossbar may be configured to dynamically determine which input ports of the crossbar are to be connected to which output ports of the crossbar based on that information.

The neural network accelerator may further comprise a data input unit configurable to receive the input data to the neural network accelerator and output the received input data to an output port of the data input unit. The output port of the data input unit may be coupled to the crossbar and the crossbar may be configured to selectively connect the output port of the data input unit to an input port of a hardware processing unit of the plurality of the hardware processing units.

A second output port of the data input unit may be coupled to an input port of the convolution processing unit, and the data input unit may be configured to selectively output received data to one of the output port of the data input unit and the second output port of the data input unit.

The neural network accelerator may further comprise a second data input unit configurable to receive the input data to the neural network accelerator and output the received input data to an output port of the second input data unit. The output port of the second data input unit may be coupled to the crossbar and the crossbar may be configured to selectively connect the output port of the second data input unit to an input port of a hardware processing unit of one of the plurality of hardware processing units.

The plurality of hardware processing units may comprise an element-wise operations processing unit configured to accelerate performing one or more element-wise operations on a set of data, and the element-wise operations processing unit may be configurable to perform the one or more element-wise operations using secondary input data; and the second data input unit is configurable to receive one of the input data to the neural network accelerator and the secondary input data.

The plurality of hardware processing units may comprise an activation processing unit configured to accelerate applying an activation function to data, and at least one of the hardware processing units of the plurality of hardware processing units, other than the activation processing unit, may comprise logic configured to apply an activation function to data generated by that hardware processing unit prior to outputting the generated data.

The logic configured to apply an activation function to data generated by a hardware processing unit may comprise a clamp configured to apply a ReLU function to data generated by the hardware processing unit.

The plurality of hardware processing units may comprise a plurality of tensel rescale processing units, each tensel rescale processing unit configurable to receive a tensor comprising one or more channels, and quantise the received tensor on a per tensor or a per channel basis to an affine fixed point number format.

The crossbar may comprise a plurality of input ports and a plurality of output ports and the crossbar may be configured to form the pipeline by connecting each of one or more input ports of the plurality of input ports of the crossbar to an output port of the plurality of output ports of the crossbar. At least one input port of the plurality of input ports of the crossbar may be configured to receive data elements with a first maximum bit width and a least one output port of the plurality of output ports of the crossbar is configured to output data elements with a second, different, maximum bit width. The crossbar may be configured to dynamically perform a bit width conversion on received data elements when the one of the at least one input ports of the crossbar with the first maximum bit width is connected to one of the at least one output ports of the crossbar with the second maximum bit width.

The first maximum bit width may be higher than the second maximum bit width and each of the at least one input port if the crossbar with the first maximum bit width may be coupled to logic that can selectively reduce the bit width of received data elements to the second maximum bit width.

The crossbar may comprise a plurality of input ports, a plurality of output ports, and a plurality of multiplexors that selectively connect the input ports of the crossbar to the output ports of the crossbar.

The plurality of multiplexors may comprise an output port multiplexor for each output port of the crossbar, each output port multiplexor configured to selectively connect one of a subset of the plurality of input ports of the crossbar to that output port of the crossbar.

The plurality of multiplexors may comprise a pre-multiplexor which is configured to selectively connect one of a plurality of the input ports of the crossbar to an input of one of the output port multiplexors.

The plurality of hardware processing units may comprise one or more of: a convolution processing unit configured to accelerate convolution operations between input data and weight data, an activation processing unit configured to accelerate applying an activation function to data, an element-wise operations processing unit configured to accelerate performing one or more element-wise operations on a set of data, a pooling processing unit configured to accelerate applying a pooling function on data, a normalisation processing unit configured to accelerate applying a normalisation function to data, and an interleave processing unit configured to accelerate rearrangement of data.

The neural network accelerators described herein may be embodied in hardware on an integrated circuit. There may be provided a method of manufacturing, at an integrated circuit manufacturing system, a neural network accelerator described herein. There may be provided an integrated circuit definition dataset that, when processed in an integrated circuit manufacturing system, configures the system to manufacture a neural network accelerator described herein. There may be provided a non-transitory computer readable storage medium having stored thereon a computer readable description of a neural network accelerator described herein that, when processed in an integrated circuit manufacturing system, causes the integrated circuit manufacturing system to manufacture an integrated circuit embodying the neural network accelerator.

There may be provided an integrated circuit manufacturing system comprising: a non-transitory computer readable storage medium having stored thereon a computer readable description of a neural network accelerator described herein; a layout processing system configured to process the computer readable description so as to generate a circuit layout description of an integrated circuit embodying the neural network accelerator; and an integrated circuit generation system configured to manufacture an integrated circuit embodying the neural network accelerator according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

7

Figure 3:
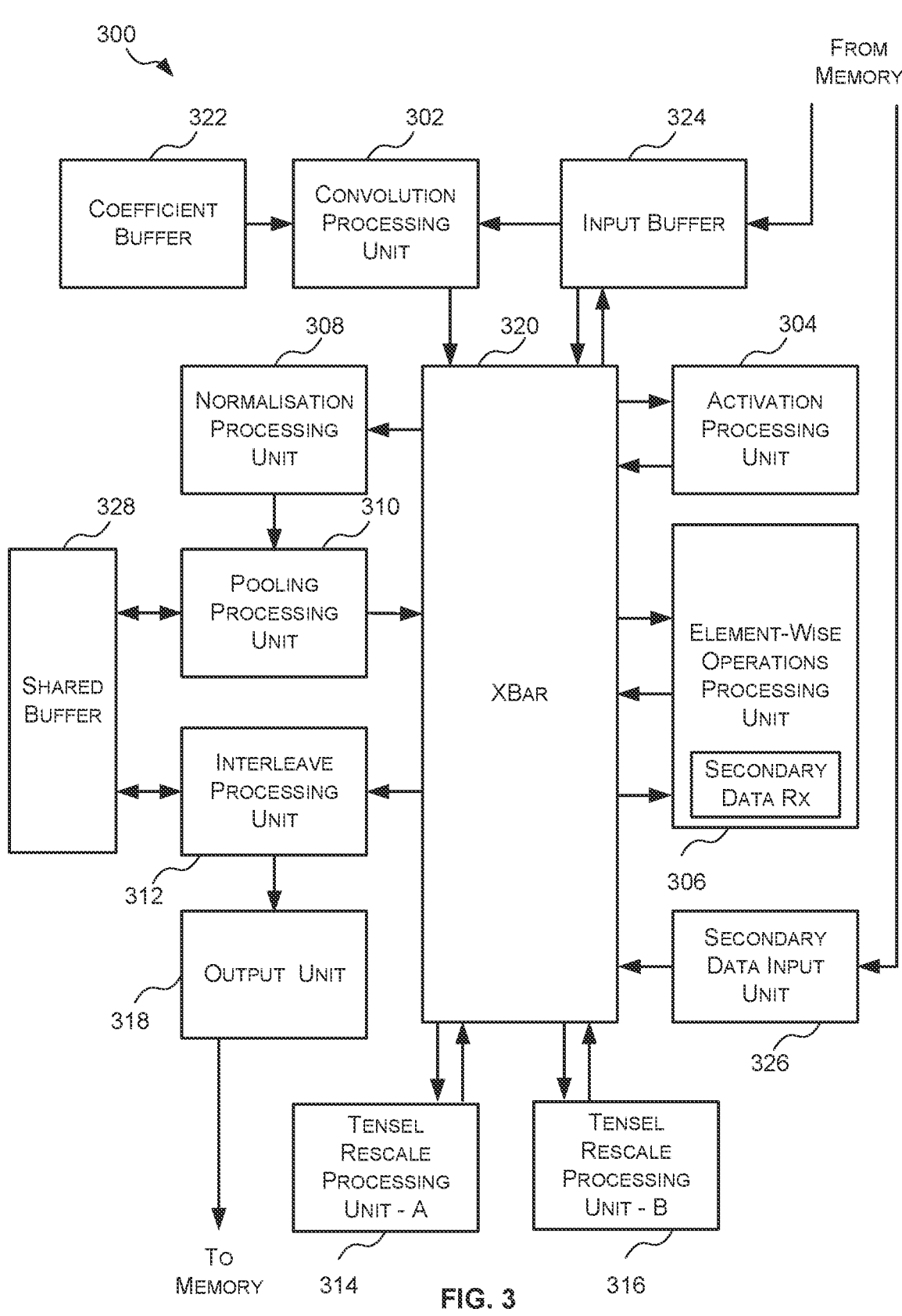
FIG. 3 is a block diagram of an example neural network accelerator (NNA) with a configurable hardware pipeline.
Figure 11:
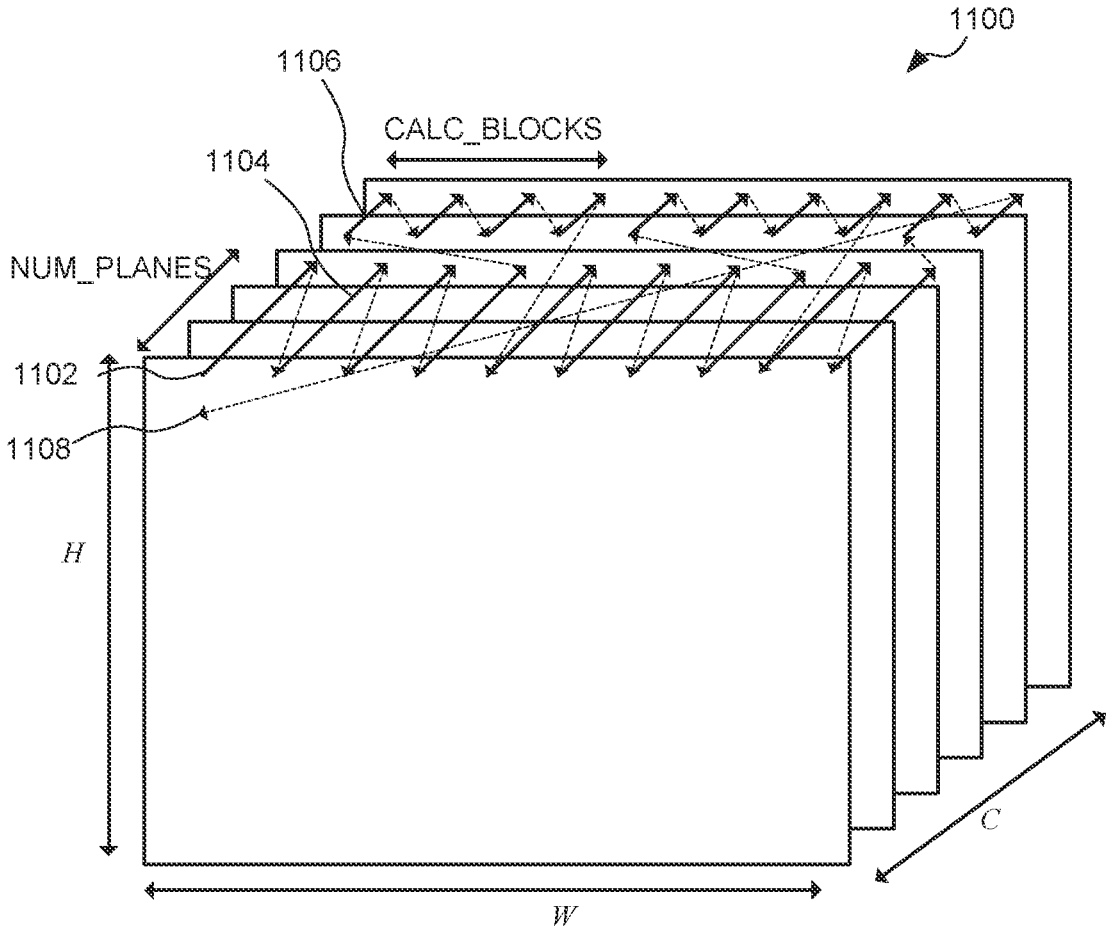
FIG. 11 is a schematic diagram illustrating a third example tensor processing order.
Figure 12:
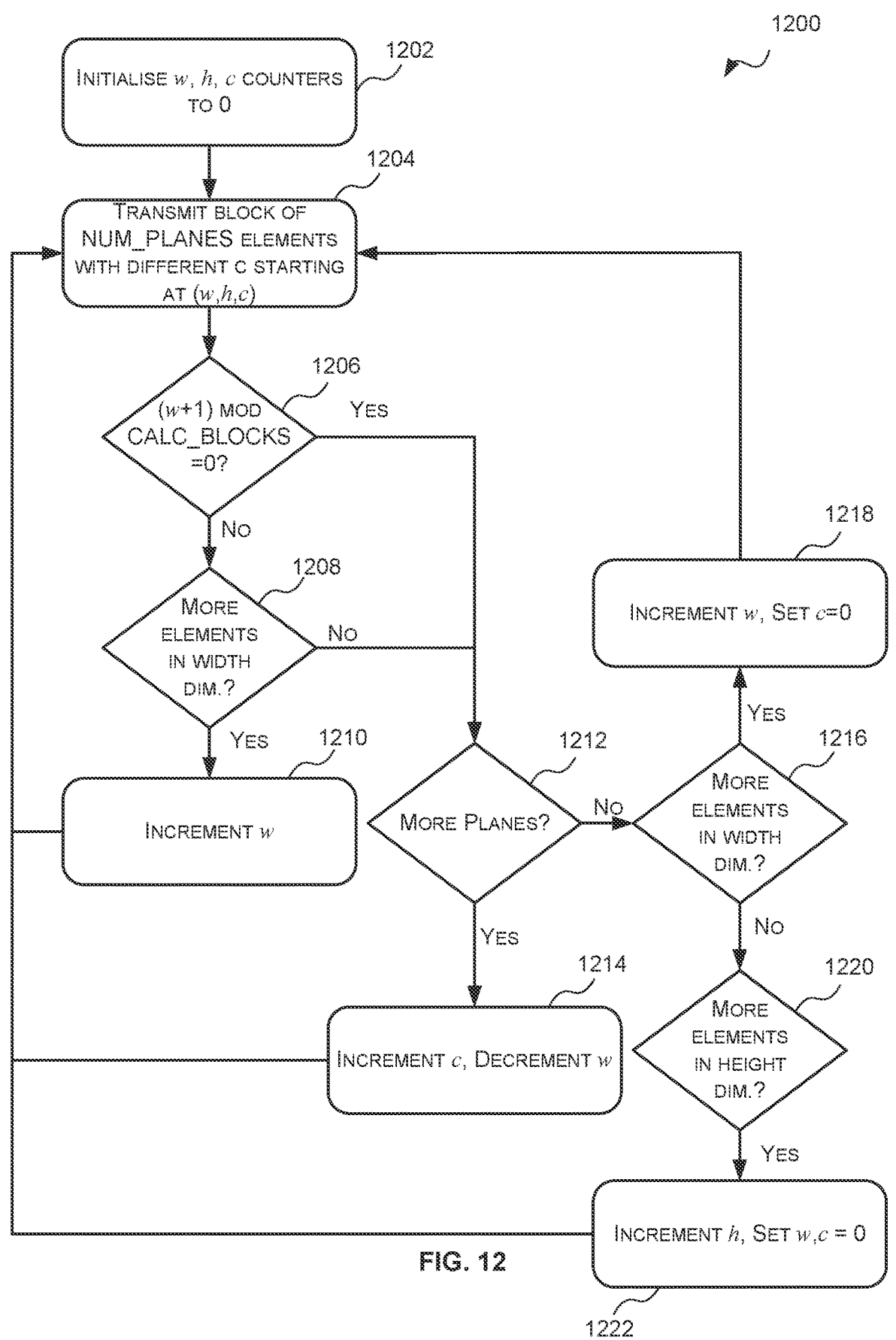
Figure 13:
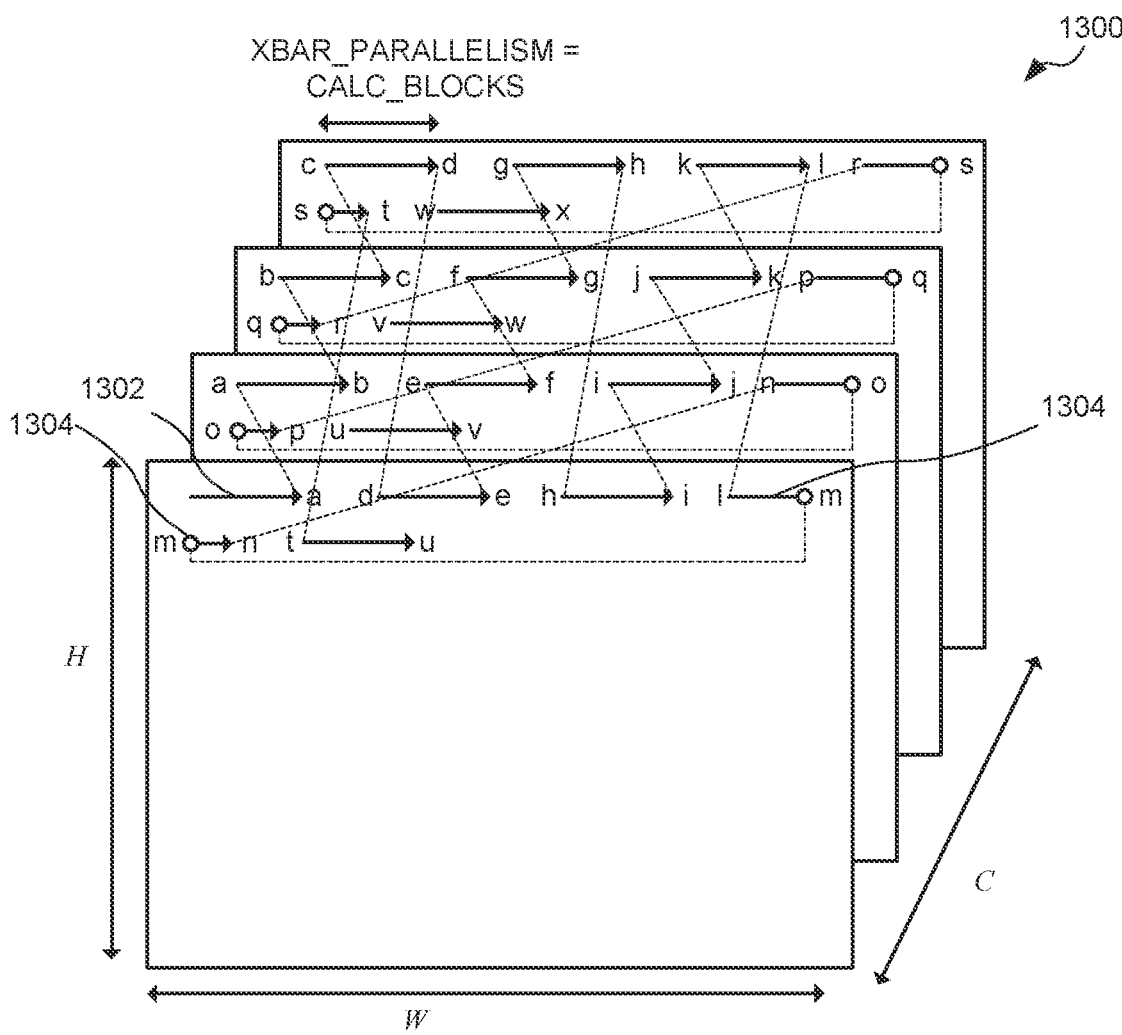
Figure 14:
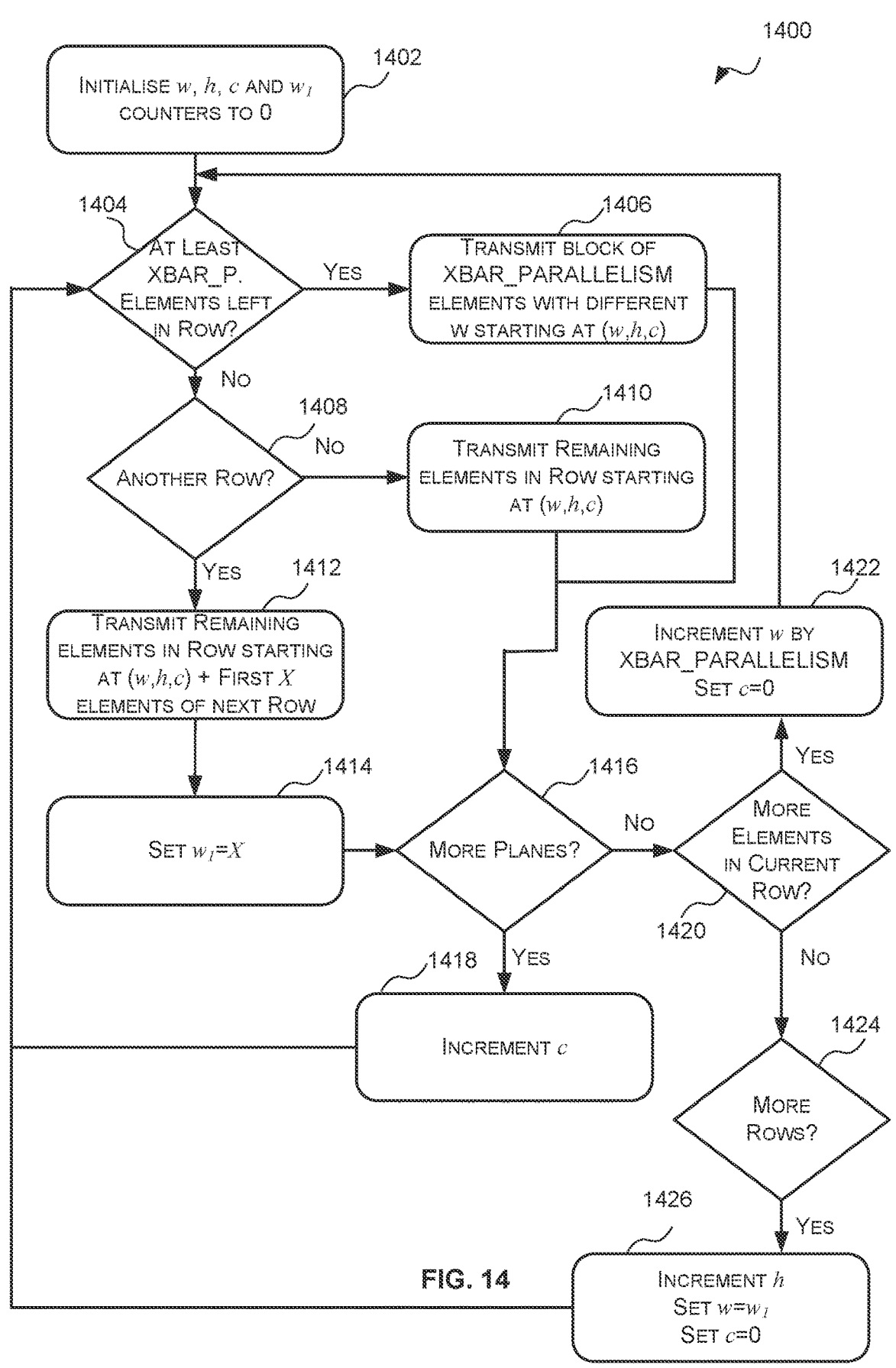
Figure 15:
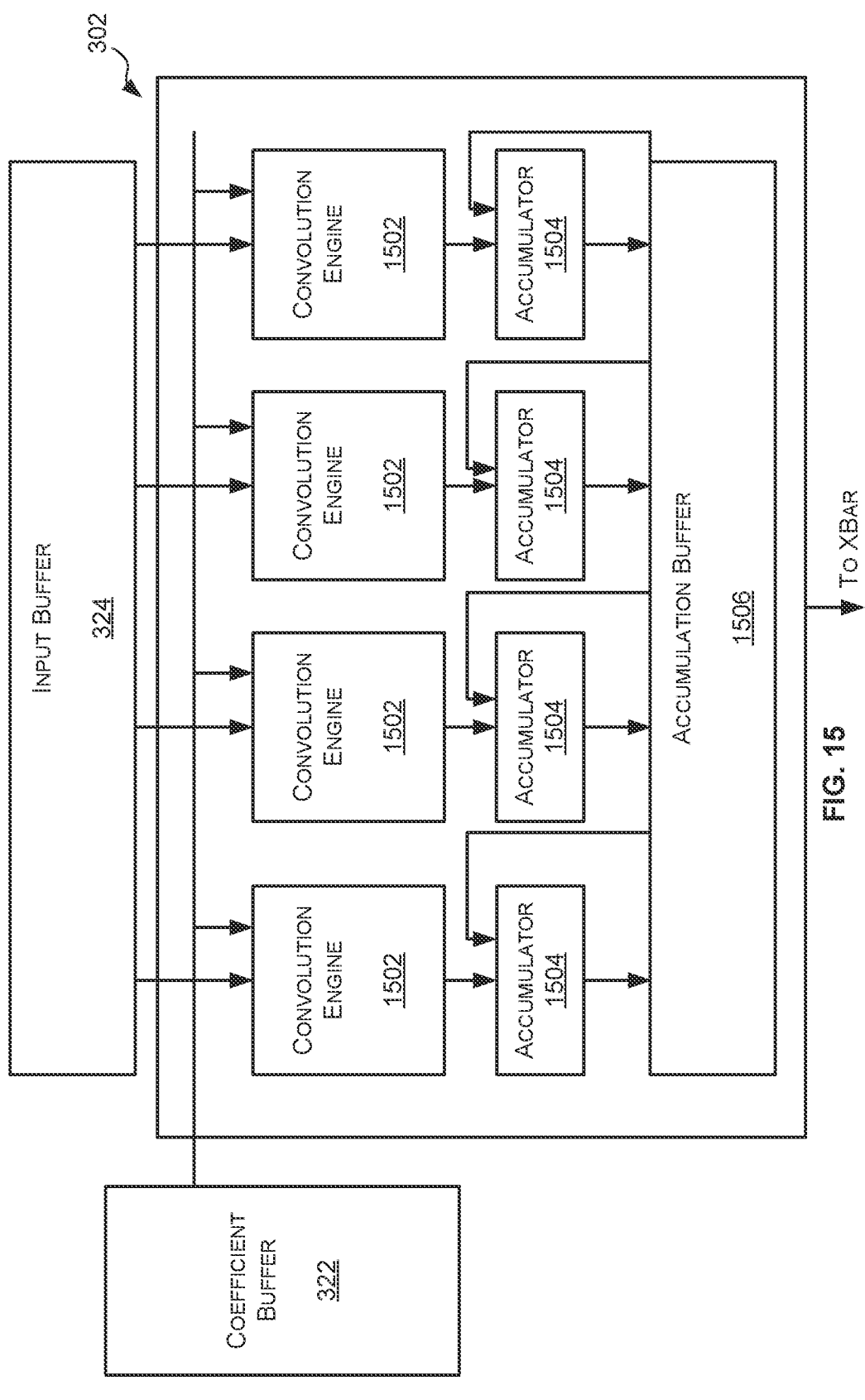
Figure 16:
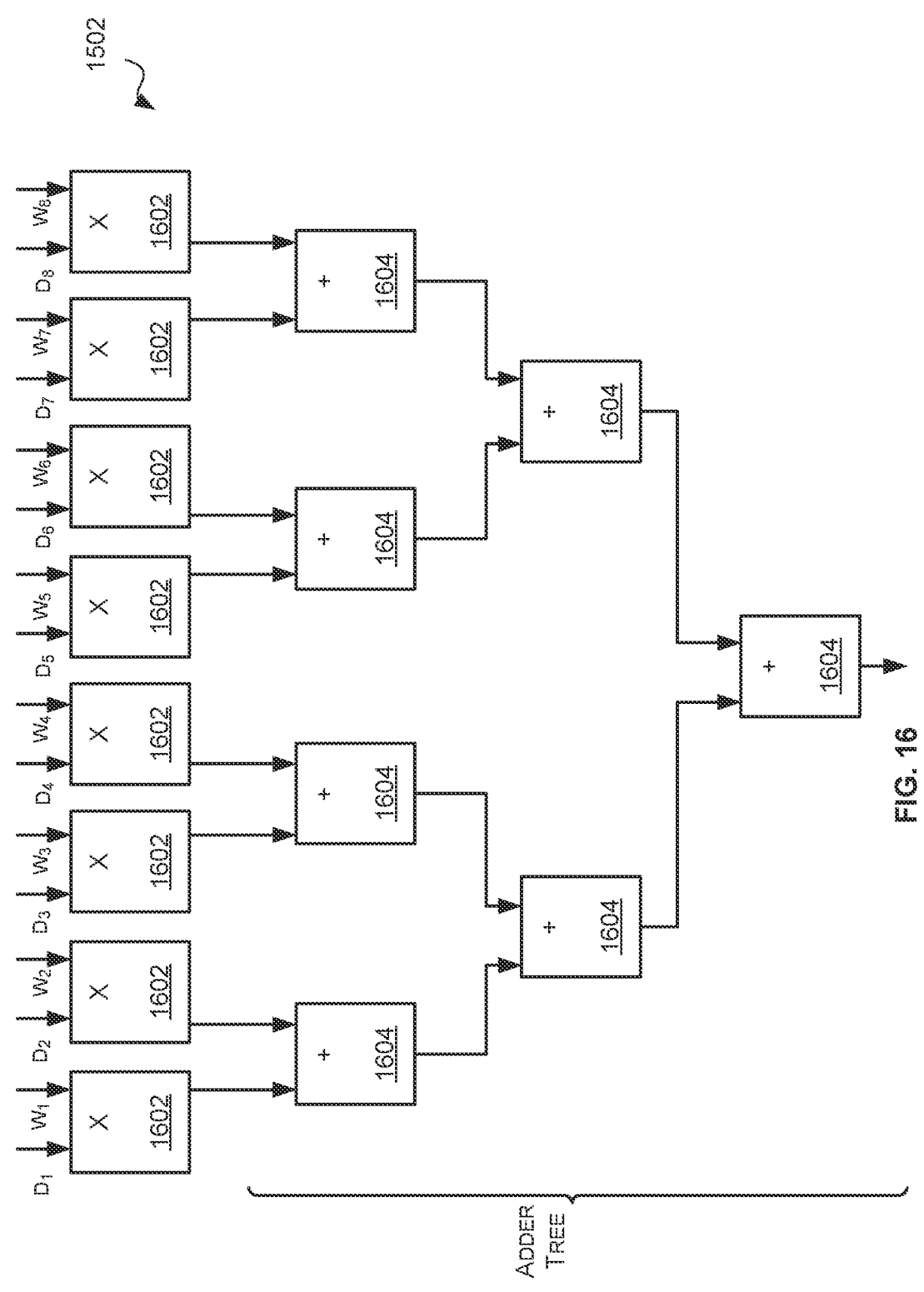
Figure 17:
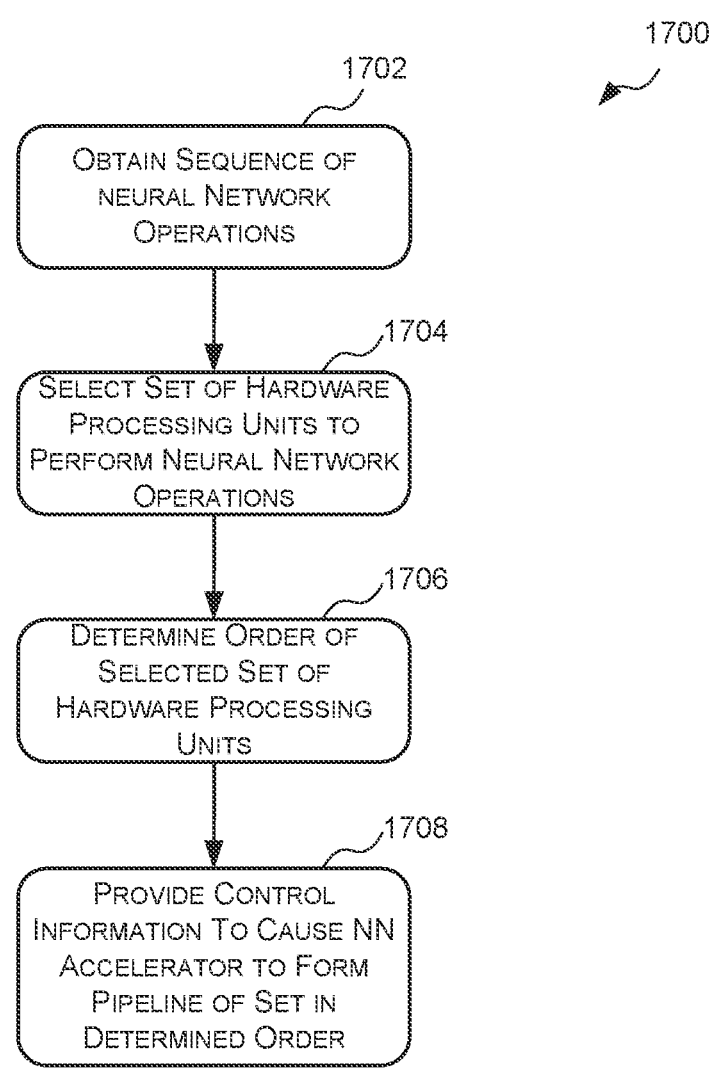
Figure 18:
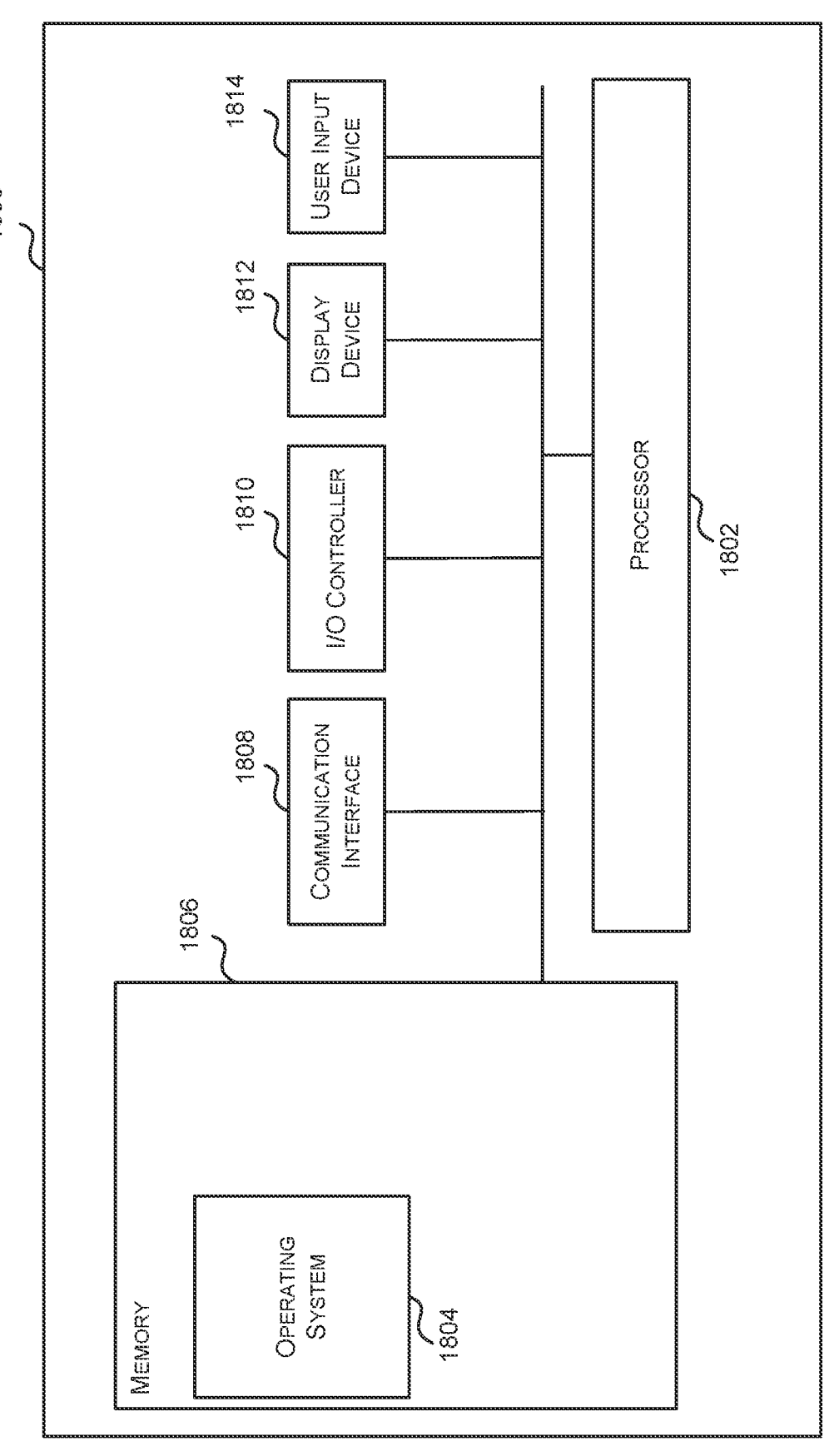
Figure 19:
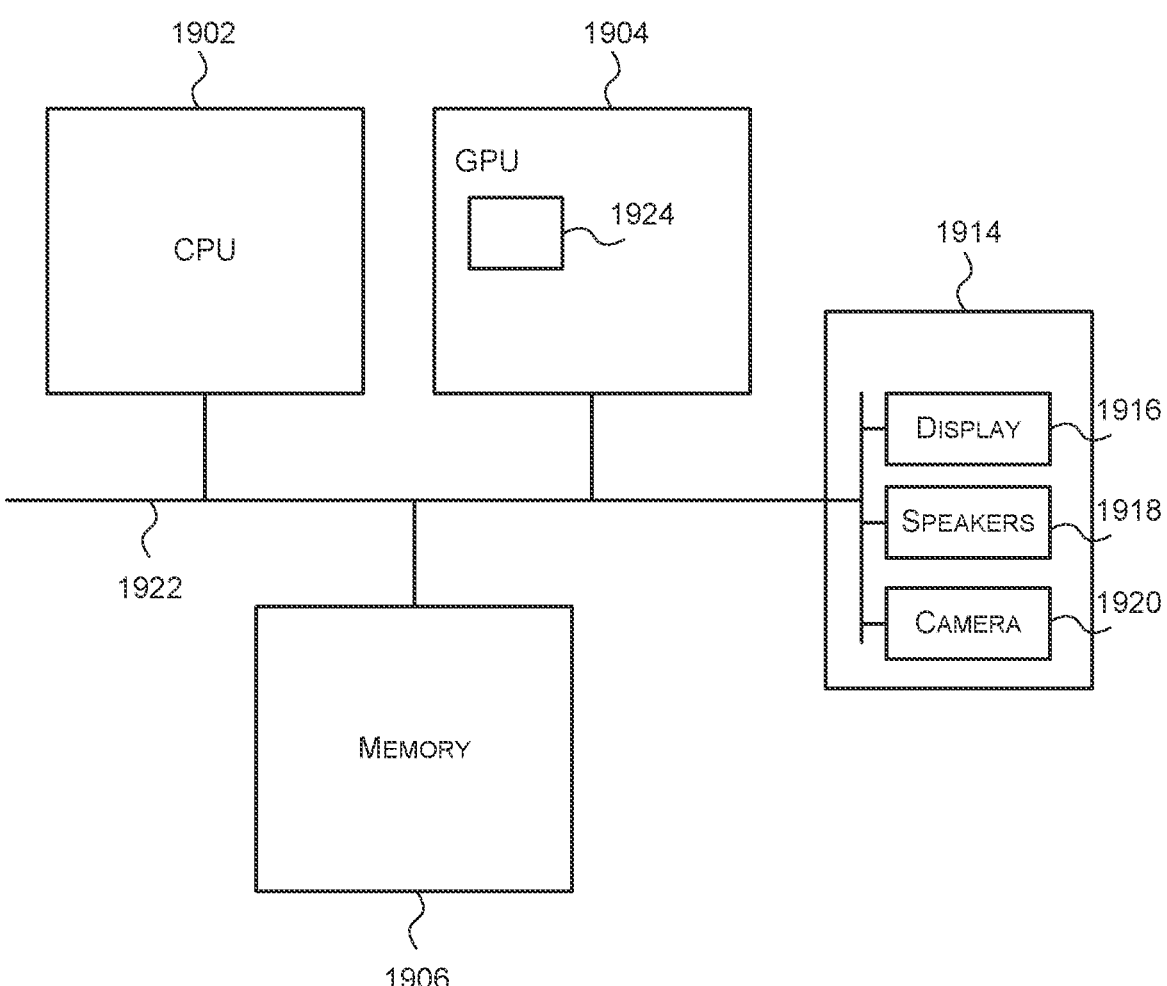
Figure 20:
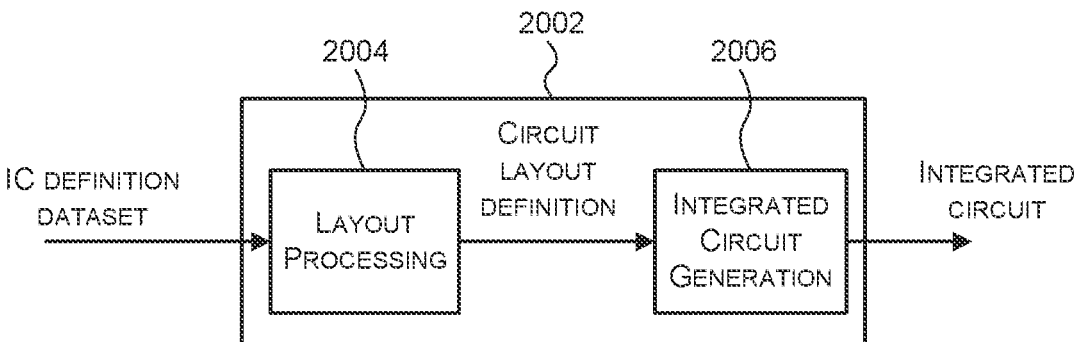

FIG. 12 is a flow diagram of an example method of transmitting a tensor in accordance with the tensor processing order of FIG. 11;

FIG. 13 is a schematic diagram illustrating a fourth example tensor processing order;

FIG. 14 is a flow diagram of an example method of transmitting a tensor in accordance with the tensor processing order of FIG. 13;

FIG. 15 is a block diagram of an example implementation of the convolution processing unit of FIG. 3;

FIG. 16 is a block diagram of an example implementation of a convolution engine of FIG. 15;

FIG. 17 is a flow diagram of an example method of configuring a neural network accelerator with a configurable pipeline to process input data;

FIG. 18 is a block diagram of an example computing-based device;

FIG. 19 is a block diagram of an example computer system in which the neural network accelerators described herein may be implemented; and FIG. 20 is a block diagram of an example integrated circuit manufacturing system for generating an integrated circuit embodying the neural network accelerators described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A neural network accelerator (NNA) is hardware that is designed to accelerate the processing of a neural network (NN). As is known to those of skill in the art, a hardware accelerator is hardware designed to perform a specific set of one or more functions more efficiently than a general processing unit, such as a central processing unit (CPU). Accordingly, in contrast to a general CPU which can be configured to perform any number of functions, an accelerator can only perform a set of one or more functions. NNAs generally have one or more hardware processing units which are each designed to accelerate one or more neural network operations. A neural network operation is defined herein as an operation that is used to implement all or a part of a neural network layer. A neural network layer may be implemented by one or more neural network operations. Example neural network operations include, but are not limited to convolution operations, non-linear operations, pooling operations and normalisation operations.

An NNA may, therefore, have, for example, a convolution processing unit which is configured to perform convolution operations, an activation processing unit which is configured to perform non-linear operations, a pooling processing unit configured to perform pooling operations, and/or a normalisation processing unit configured to perform normalisation operations. It will be evident to a person of skill in the art that this is just an example set of hardware processing units that an NNA may have and NNAs may have additional hardware processing units, fewer hardware processing units or a different combination of hardware processing units.

Some NNAs, such as that described in the Applicant's Published GB Patent Application No. 2566702, which is herein incorporated by reference in its entirety, may be configured to process or implement a NN over a number of hardware passes of the NNA. A hardware pass of the NNA is defined herein as the loading of input data into the NNA and processing the input data using one or more hardware units of the NNA to generate processed data, or output data. The output data of a hardware pass may be output from the NNA to memory (which may be memory that is external to the NNA, but is internal to the chip on which the NNA is situated (i.e. on-chip memory), or memory that is external to the NNA and is external to the chip on which the NNA is situated (i.e. off-chip memory)) or, in some cases, may be stored in the NNA for use in a subsequent hardware pass.

In some NNAs, to allow the input data for a hardware pass to be processed by more than one hardware processing unit in a hardware pass, the hardware processing units may be configured in a fixed order pipeline. As is known to those of skill in the art, a pipeline comprises a set of processing units wherein the output of a processing unit in the set is the input to a processing unit in the set. For example, if the NNA comprises a convolution processing unit, an activation processing unit, a normalisation processing unit and a pooling processing unit, the hardware processing units may be connected to form a pipeline such that the input data can be processed by the convolution processing unit, activation processing unit, normalisation processing unit and then the pooling processing unit in a hardware pass. Known NNAs have the pipeline configured to allow the input data to be processed by the convolution processing unit and then the activation processing unit since classical neural networks comprise sequences of a convolution layer followed by an activation layer. Furthermore, to allow input data to be only processed by a single hardware unit in a hardware pass, the NNA may allow any of the hardware processing units in the pipeline to be bypassed in a hardware pass. A hardware processing unit may be by-passed by either (i) having a by-pass path so that the data is not input to the hardware processing unit; or (ii) configuring the hardware processing unit to simply pass the received data to the output. However, as the pipeline is fixed, the order in which the hardware processing units process data in a hardware pass is fixed.

The hardware processing units that are active, or process data, in a hardware pass may be determined, for example, in software based on the order of the layers in the NN, the available hardware processing units and the size of the NNA storage units. Specifically, there may be a software tool that is configured to map the neural network to a set of operations that can be performed by the NNA and then group those operations into hardware passes in a greedy fashion either from the start or the end of the NN. For example, the software tool may first group the layers of the NN into layer groups where a layer group is a group of layers in which the operations used to implement those layers could be performed in a single hardware pass of the NNA. A layer group may, in some cases, be further split into smaller chunks each of which can be executed in a hardware pass. A layer group may be split into smaller chunks due to hardware restrictions on the amount of processing that can be performed in a hardware pass or the amount of data that can be stored in a hardware pass. For example, a convolution layer may comprise 64 filters, but the NNA may only be able to perform a convolution with up to 32 filters in a hardware pass. In such cases, 32 of the filters may be processed in a first hardware pass, and the remaining 32 may be processed in a second hardware pass. Generally, the more operations that can be performed in a hardware pass, the more efficiently the NN can be implemented as this minimises the number of memory reads and writes, and increases the performance by allowing the processing of a subsequent operation to start before the previous operation has completed.

However, while fixed pipeline structures are designed to take advantage of the structure of classical neural networks, the order of the layers (and thus operations) in a NN can be arbitrary. Furthermore, as the use of NNs continues to expand and evolve, more and more neural networks are being developed that do not have the classical structure. Therefore, having a fixed order pipeline limits the efficiency of the NNA in processing some neural networks. For example, if a NN comprises a pooling layer followed by a convolution layer, then an NNA with a fixed hardware pipeline comprising a convolution processing unit followed by an activation processing unit would have to implement such a sequence in two hardware passes as activation operations cannot precede convolution operations in the same hardware pass.

Accordingly, the inventors have developed an NNA with a configurable pipeline of hardware processing units. Specifically, in the NNAs described herein the hardware processing units are connected to a crossbar which can selectively, on a per hardware pass basis, form one of a plurality of pipelines from the hardware processing units. This allows different pipelines of hardware processing units to be implemented in different hardware passes. For example, in a first hardware pass the crossbar may be configured to form a pipeline that comprises the activation processing unit followed by the convolution processing unit such that input data to the NNA can be processed by the activation processing unit and then the convolution processing unit; and in a second hardware pass the crossbar may be configured to form a pipeline that comprises the convolution processing unit, the activation processing unit and the pooling processing unit such that input data to the NNA can be processed by the convolution processing unit, activation processing unit and then the pooling processing unit. Therefore, in the NNAs described herein, not only are the hardware processing units that are active (i.e. process data) in a hardware pass configurable, but the order in which the hardware processing units process data in a hardware pass is also configurable.

As described in more detail below, the NNAs described herein may significantly improve the efficiency of processing some NNs as it can decrease the number of hardware passes required to process those NNs by increasing the number of operations that can be performed per hardware pass. As described above, each hardware pass involves reading data from memory, and may include writing data to memory. Reading and writing data from memory consumes a significant amount of power and processing cycles, and may introduce a latency in the start of executing a hardware pass. Therefore decreasing the number of hardware passes to implement an NN increases the power efficiency of the NNA in implementing the NN. Furthermore, when a set of operations are performed in a hardware pass, subsequent operations in the set can be started before earlier operations in the set are complete which speeds up the execution of those operations. Therefore increasing the number of operations that can be performed in the same hardware pass can reduce the time for performing those operations.

Furthermore, most NNAs have a convolution processing unit, or the like, configured to perform/accelerate convolution operations. Many NNAs known to the Applicant have the convolution processing unit as the first element in a fixed pipeline. However, the convolution processing unit is generally the most resource intensive component of an NNA, and limiting the convolution processing unit as the first element of a hardware pass can significantly increase the number of hardware passes to implement an NN. Accordingly, connecting the convolution processing unit to the crossbar to allow convolution operations to be performed anywhere in a hardware pass has shown to significantly increase the efficiency at which the NNAs described herein can implement a NN.

In addition, since in the examples described herein the hardware processing units may receive input tensors and/or send output tensors to different hardware processing units in different hardware passes, one or more of the hardware processing units may be configured to support a plurality of different orders for transmitting and/or receiving input tensors, which may be referred to herein as processing orders, and the processing order that is used in a hardware pass to transmit or receive a tensor may be based on the component that is to receive the tensor from, or transmit the tensor to, that hardware processing unit respectively. For example, when the output tensor of the convolution processing unit is provided to the activation processing unit, it may be advantageous to transmit the output tensor to the activation processing unit using a first processing order, and when the output tensor of the convolution processing unit is provided to the pooling processing unit it may be advantageous to transmit the output tensor to the pooling processing unit using a second, different, processing order. Accordingly, it is advantageous for one or more of the hardware processing units to support a plurality of processing orders for transmitting and/or receiving a tensor wherein the processing order that is used to transmit or receive a tensor in a hardware pass is based on the pipeline used in that hardware pass. Example different processing orders which may be supported by one or more of the hardware processing units are described below.

Reference is now made to FIG. 3 which illustrates an example NNA 300 with a configurable pipeline of hardware processing units. The NNA 300 comprises a plurality of hardware processing units 302, 304, 306, 308, 310, 312, 314, 316; and a crossbar ("Xbar") 320 that is coupled to the hardware processing units and can selectively form one of a plurality of pipelines from the hardware processing units. The phrase "forming a pipeline from the hardware processing units" is used herein to mean connecting the inputs and outputs of a set of hardware processing units such that the output of one hardware processing unit becomes the input to another hardware processing unit.

Each hardware processing unit 302, 304, 306, 308, 310, 312, 314, 316 comprises hardware configured to accelerate performing one or more neural network operations on input data. Specifically, each hardware processing unit 302, 304, 306, 308, 310, 312, 314, 316 comprises an input port configured to receive input data, hardware logic to perform one or more operations on the input data, and an output port configured to output the results of the processing, which may be referred to as the output data. As described in more detail below, one or more of the hardware processing units may also comprise one or more additional ports to receive secondary data which is used to process the input data, and/or to write and/or read data from a buffer. The NNA 300 of FIG. 3 comprises the following hardware processing units: a convolution processing unit 302 which is configured to perform convolution operations on the received input data, an activation processing unit 304 which is configured to perform non-linear operations on the received input data, an element-wise operations processing unit 306 which is configured to perform element-wise operations on the received input data, a normalisation processing unit 308 which is configured to perform normalisation operations on the received input data, a pooling processing unit 310 which is configured to perform pooling operations on the received input data, an interleave processing unit 312 which is configured to performing interleaving or rearranging of the received input data, and tensel rescale processing units 314, 316 which are configured to scale or rescale input data. Each of these hardware processing units are described in more detail below. It will be evident to a person of skill in the art that this is just an example set of hardware processing units and that other NNAs may have additional hardware processing units, fewer hardware processing units and/or different hardware processing units.

The NNA 300 of FIG. 3 is configured to process a NN in one or more hardware passes of the NNA 300. In a hardware pass of the NNA 300, the NNA 300 loads input data into the NNA (e.g. from external memory) and processes that input data via a pipeline formed of one or more of the hardware processing units 302, 304, 306, 308, 310, 312, 314, 316 to generate processed data. In most hardware passes the processed data is then output from the NNA (e.g. to external memory) via an output unit 318. However, in some cases, the processed data may remain in the NNA for use in a subsequent hardware pass. For example, as described in more detail below, it may take several passes of the convolution processing unit 302 to generate a convolution layer output. Therefore, in some cases, the convolution processing unit 302 may perform partial convolution processing in one hardware pass and store the results of that partial processing in the convolution processing unit (e.g. the accumulation buffer thereof); and then perform more partial convolution processing in one or more subsequent hardware passes and then combine the partial results generated in the hardware passes to generate the final convolution output. A convolution layer may be implemented over several hardware passes because of the internal storage restrictions of the NNA (e.g. the input buffer 324 may not be large enough to store the entire input tensor and/or the coefficient buffer 322 may not be large enough to store the entire tensor of weights) and or the processing restrictions of the NNA.

The term "input data to the NNA" will be used herein to mean the input data that is loaded into the NNA for a hardware pass, and may alternatively be referred to as the "input data for a hardware pass". The input data to a hardware processing unit may be (i) the input data for the hardware pass if the hardware processing unit is the first hardware processing unit in the pipeline for that hardware pass, or (ii) the output data generated by another hardware processing unit if the hardware processing unit is not the first hardware processing unit in the pipeline for that hardware pass.

The input data for a hardware pass is loaded into the NNA via a data input unit 324, 326. The NNA may comprise a single data input unit 324 or more than one data input unit 324, 326. As shown in FIG. 3, one of the data input units 324 may be in the form of an input buffer 324 which can be configured to store the input data for the hardware pass. The input buffer 324 may be coupled to both the convolution processing unit 302 and the crossbar 320, which allows the input buffer 324 to provide the received input data to the convolution processing unit 302 or the crossbar 320. Although the input buffer 324 is shown in FIG. 3 as a single input buffer, the input buffer may be formed of a plurality of banks. In some cases, it may only be possible to use the input buffer 324 once in a hardware pass, thus the input buffer 324 may either be able to provide input data to the convolution processing unit 302 or the crossbar 320 in a hardware pass, but not both.

NNAs known to the Applicant have a single data input unit 324. However, as shown in FIG. 3, the NNAs described herein may have a second, secondary or alternate data input unit 326 by which the input data for a hardware pass can be loaded into the NNA, which may be less complex and use less energy than the primary data input unit (e.g. the input buffer 324). For example, as described in more detail below, the element-wise operations processing unit 306 may be able to perform element-wise operations on received input data using a secondary set of input data which is loaded into the NNA. Accordingly, there may be a secondary data input unit 326 which is configured to load the secondary data input into the NNA which is provided to the element-wise operations processing unit 306 (e.g. the second data receiver (Rx) thereof). By coupling the secondary data input unit 326 to the crossbar 320, the secondary data input unit 326 can provide an alternate path to load the input data for a hardware pass into the NNA 300.

To allow the secondary data input unit 326 to be simpler and more energy efficient than the input buffer 324, the secondary data input unit 326 may not have all of the features of the input buffer 324. For example, while the NNA may be configured to perform fixed point number format operations, the input buffer 324 may be able to receive input data in a floating point number format and convert it into a fixed point number format, whereas the secondary data input unit 326 may only be able to receive input data in a fixed point number format. Furthermore, in some cases, the input buffer 324 may be able to receive input data in a plurality of different formats, whereas the secondary data input unit may only be able to receive input data in a subset of those formats. This may be because, for example, the secondary data input unit 326 may have less memory or storage available than the input buffer 324.

Accordingly, where the input data for the hardware pass is not going to be first processed by the convolution processing unit (and it meets any other requirements for using the secondary data input unit 326) it may be more energy efficient to load the input data for the hardware pass into the NNA via the secondary data input unit 326 than the input buffer 324. In some cases, it may only be possible to use the secondary data input unit 326 once in a hardware pass, thus the secondary data input unit 326 may either be used to provide secondary input data to the element-wise operations processing unit 306 or to provide the input data for a hardware pass, but not both. In these cases, if the secondary data input unit 326 is used to provide the input data for a hardware pass, then the element-wise operations processing unit 306 cannot perform an element-wise operation with secondary input data in that hardware pass. However, the element-wise operations processing unit 306 can still be used to perform element-wise operations without secondary input data in that hardware pass.

In the example shown in FIG. 3, the secondary data receiver (Rx) of the element-wise operations processing unit 306 is coupled, or connected, to the crossbar 320. This allows the secondary data receiver (Rx) of the element-wise operations processing unit 306 to receive secondary input data from the secondary data input unit 326 or another unit via the crossbar 320. However, in some cases, the secondary data receiver (Rx) of the element-wise operations processing unit 306 may only be able to receive secondary input data from the secondary data input unit 326. In these cases, the crossbar 320 may be simplified by removing the connection between the secondary data receiver (Rx) of the element-wise operations processing unit 306 and the crossbar and connecting the secondary data receiver (Rx) directly to the secondary data input unit 326. In such cases, the secondary data input unit may comprise logic (e.g. demultiplexer) that is configured to receive information each hardware pass indicating whether it is active in that hardware pass, and if so, whether the received data is to be provided to the crossbar 320 or the secondary data receiver (Rx) and direct the received data to the appropriate device. This allows the data received by the secondary data input unit to be used to provide the input data for the hardware pass via the crossbar 320, or provide secondary data to the secondary data receiver (Rx) of the element-wise operations processing unit 306 directly (without having to go through the crossbar 320).

In some cases, the NNA 300 may include a memory interface (not shown) configured to provide an interface between the NNA 300 and external memory (not shown). In these cases, the memory interface may be configured to receive from external memory the input data for the NNA and provide it to the input buffer 324 and/or the secondary data input unit 326.

Each hardware pass the NNA receives control information, which may also be referred to as command information, identifying the components of the NNA which are active in that hardware pass, and the order in which the active components are to be used in the hardware pass. The control information may also specify any individual component configurations for the hardware pass. For example, as described in more detail below, the functions and/or operations that are implemented by one or more of the activation processing unit 304, the element-wise operations processing unit 306, the normalisation processing unit 308 and the pooling processing unit 310 may be configurable on a per hardware pass basis. In these cases, the control information may include information identifying the function and/or operations that are to be implemented by one or more of those processing units in the hardware pass.

Where the NNA 300 comprises a memory interface (not shown), the control information may be received via the memory interface. In some cases, the control information may be received by a command decoder (not shown) which decodes the control information and sends information to the components of the NNA 300 indicating whether they are active in the hardware pass, and if so, how they are to configure themselves for the hardware pass. In other cases, each component in the NNA may directly receive, each hardware pass, control information which indicates whether that component is active in the hardware pass, and if so, how that component is to configure itself for the hardware pass. Either way, each component in the NNA receives, per hardware pass, control information indicating whether that component is to be active in that hardware pass and if so, how it is to be configured. The information indicating how the crossbar 320 is to be configured for a hardware pass may comprise information identifying a pipeline of the plurality of pipelines to be formed by the units of the NNA.

Specifically, each hardware pass the crossbar 320 determines, from the control information whether it is active in the current hardware pass, and if it determines that it is active in the current hardware pass it dynamically configures itself to form the pipeline of the plurality of pipelines identified by the control information for that hardware pass. In some cases, the crossbar 320 may not be active in a hardware pass if, for example, there is only one hardware processing unit active in the hardware pass (e.g. the convolution processing unit 302) and the result of the hardware pass is stored internally (e.g. within the NNA) or is passed to the output unit 318 via an alternate (e.g. by-pass) path. For example, in some cases there may be an alternate or by-pass path (not shown) between the convolution processing unit 302 and the output unit 318 that allows the output of the convolution processing unit 302 to be sent directly to the output unit (e.g. without passing through the crossbar 320).

The crossbar 320 comprises a plurality of input ports (shown in FIG. 3 by arrows pointing into the crossbar 320), a plurality of output ports (shown in FIG. 3 by arrows pointing out from the crossbar 320) and routing logic (e.g. multiplexors (not shown)) that allows the crossbar 320 to selectively connect input ports of the crossbar 320 to output ports of the crossbar 320. In the example of FIG. 3, each input port of the crossbar 320 may be coupled, or connected, to an output port of a hardware processing unit or a data input unit, and each output port of the crossbar 320 may be coupled, or connected, to an input port of a hardware processing unit or a data input unit. An example implementation of the crossbar 320 is described below with respect to FIG. 4.

In some cases, the crossbar 320 may be able to form any possible pipeline from the units of the NNA (e.g. hardware processing units and data input units). In other words, in some cases, the crossbar 320 may be able to connect the hardware processing units and data input units in any possible manner (e.g. any output port of a unit may be connected to any input port of a unit). However, in other cases, there may be one or more restrictions on which units of the NNA can be connected to each other, which may limit the number of pipelines which can be formed by the crossbar 320. For example, in some cases, any unit (e.g. hardware processing unit, data input unit) of the NNA 300 may only be used once during a hardware pass. In these cases, it may not be permissible to create a pipeline in which the output port of a unit is connected to the input port of the same unit. For example, it may not be permissible to create a pipeline in which the output port of the activation processing unit is coupled to the input port of the activation processing unit. In other cases, there may be other restrictions. For example, in some cases, a first unit may format the data for a second unit so that for data to be processed by the second unit it must be first sent to the first unit. For example, in the example of FIG. 3 the normalisation processing unit 308 may be configured to format the input data to the pooling processing unit 310, thus the pooling processing unit 310 may be configured to receive the input data for a hardware pass via the normalisation processing unit 308. Similarly, in the example of FIG. 3, in many cases the interleave processing unit 312 may reformat the data for the output unit 318, thus the output unit 318 may be configured to receive the input data for a hardware pass via the interleave processing unit 312. There may be a few cases where the input data to the output unit 318 may not need to be reformatted, in these cases the interleave processing unit 312 may be by-passed. It will be evident to a person of skill in the art that these are example restrictions.

Table 1 below provides a listing of the possible inputs for each of the units of the NNA 300 of FIG. 3 according to an example set of restrictions. It will be evident to a person of skill in the art that this is an example only.

TABLE 1

| Unit | Possible Inputs | Excluded Inputs (other than self) |
|---|---|---|
| Input Buffer | Activation Processing Unit Element-Wise Operations Processing Unit Pooling Processing Unit Tensel Rescale Processing Unit-A Tensel Rescale Processing Unit-B | Secondary data input unit |
| Activation Processing Unit | Convolution Processing Unit Input Buffer Element-Wise Operations Processing Unit Secondary Data Input Unit Pooling Processing Unit Tensel Rescale Processing Unit-A Tensel Rescale Processing Unit-B | None |
| Element-Wise Operations Processing Unit | Convolution Processing Unit Input Buffer Activation Processing Unit Pooling Processing Unit Tensel Rescale Processing Unit-A Tensel Rescale Processing Unit-B | None |
| Secondary Data Rx | Secondary Data Input Unit | Convolution Processing Unit Input Buffer Activation Processing Unit Element-Wise Operations Processing Unit Pooling Processing Unit Tensel Rescale Processing Unit-A Tensel Rescale Processing Unit-B |
| Normalisation Processing Unit | Convolution Processing Unit Input Buffer Activation Processing Unit Element-Wise Operations Processing Unit Secondary Data Input Unit Tensel Rescale Processing Unit-A Tensel Rescale Processing Unit-B | None |
| Tensel Rescale Processing Unit-A | Convolution Processing Unit Input Buffer Activation Processing Unit Element-Wise Operations Processing Unit Secondary Data Input Unit Pooling Processing Unit Tensel Rescale Processing Unit-B | None |
| Tensel Rescale Processing Unit-B | Convolution Processing Unit Input Buffer Activation Processing Unit Element-Wise Operations Processing Unit Secondary Data Input Unit Pooling Processing Unit Tensel Rescale Processing Unit-A | None |
| Interleave Processing Unit | Convolution Processing Unit Input Buffer Activation Processing Unit Element-Wise Operations Processing Unit Pooling Processing Unit | None |

TABLE 1-continued

| Unit | Possible Inputs | Excluded Inputs (other than self) |
|---|---|---|
| | Tensel Rescale Processing Unit-A Tensel Rescale Processing Unit-B | |

In some cases, the control information identifying the pipeline of the plurality of pipelines to be implemented by the crossbar 320 in a hardware pass may explicitly identify which input ports of the crossbar 320 are to be connected to which output ports of the crossbar 320. In some cases, the crossbar 320 may comprise a register for each output port, and the value of the register indicates the input port that is to be connected to that output port. For example, the input ports may be numbered and the register for an output port may be set, by the control information, to the value of the relevant input port. For example, if the output from the activation processing unit 304 is to be directed to the input of the element-wise operations processing unit 306, and the output port of the activation processing unit 304 is connected or coupled to input port 2 of the crossbar 320, the register associated with the output port of the crossbar 320 connected or coupled to the input port of the element-wise operations processing unit 306 may be set to 2.

Table 2 illustrates an example numbering of the output ports of the crossbar 320 of FIG. 3 and Table 3 illustrates an example numbering of the input ports of the crossbar 320 of FIG. 3.

TABLE 2

| Unit | Crossbar Output Port |
|---|---|
| Input Buffer | 1 |
| Activation Processing Unit | 2 |
| Element-Wise Operations Processing Unit | 3 |
| Secondary Data Rx | 4 |
| Normalisation Processing Unit | 5 |
| Tensel Rescale Processing Unit-A | 6 |
| Tensel Rescale Processing Unit-B | 7 |
| Interleave Processing Unit | 8 |

TABLE 3

| Units | Crossbar Input Port |
|---|---|
| Convolution Processing Unit | 1a |
| Input Buffer | 1b |
| Activation Processing Unit | 2 |
| Element-Wise Operations Processing Unit | 3 |
| Secondary Data Input Unit | 4 |
| Pooling Processing Unit | 5 |
| Tensel Rescale Processing Unit-A | 6 |
| Tensel Rescale Processing Unit-B | 7 |

Table 4 illustrates an example set of registers which are used to control which pipeline of a plurality of pipelines is implemented by the crossbar 320 in a hardware pass. In this example there is register for each output port in Table 2. Table 4 shows the acceptable values for each register in accordance with the example crossbar port numbering described in Tables 2 and 3 and the example restrictions described above with respect to Table 1. In this example each register is four bits even though three bits would be sufficient to allow all of the units to be connected to each other via the crossbar 320.

TABLE 4

| Configuration Register | Description | Register Values |
|---|---|---|
| 1 | Selects input to Input Buffer | 0-disabled (input buffer not receiving input from crossbar in hardware pass)<br>1-invalid (self)<br>2-activation processing unit<br>3-element-wise operations processing unit<br>4-invalid<br>5-pooling processing unit<br>6-tensel rescale processingunit-A<br>7-tensel rescale processingunit-B<br>8-15-not used |
| 2 | Selects input to Activation Processing Unit | 0-disabled (activation processing unit not active in hardware pass)<br>1-convolution processing unit/input buffer<br>2-invalid (self)<br>3-element-wise operations processing unit<br>4-secondary data input unit<br>5-pooling processing unit<br>6-tensel rescale processing unit-A<br>7-tensel rescale processing unit-B<br>8-15-not used |
| 3 | Selects input to Element-Wise Operations Processing Unit | 0-disabled (element-wise operations processing unit not active in hardware pass)<br>1-convolution processing unit/input buffer<br>2-activation processing unit<br>3-invalid (self)<br>4-secondary data input unit<br>5-pooling processing unit<br>6-tensel rescale processing unit-A<br>7-tensel rescale processing unit-B<br>8-15-not used |
| 4 | Selects input to Secondary Data Rx | 0-disabled (element-wise operations processing unit not active in hardware pass or secondary data not required for hardware pass)<br>1-invalid<br>2-invalid<br>3-invalid<br>4-secondary data input unit<br>5-invalid<br>6-invalid<br>7-invalid<br>8-15-not used |
| 5 | Selects input to Normalisation Processing Unit | 0-disabled (normalisation processing unit and pooling processing unit inactive)<br>1-convolution processing unit/input buffer<br>2-activation processing unit<br>3-element-wise operations processing unit<br>4-secondary data input unit<br>5-invalid (self)<br>6-tensel rescale processing unit-A<br>7-tensel rescale processing unit-B<br>8-15-not used |
| 6 | Selects input to Tensel Rescale Processing Unit-A | 0-disabled (tensel rescale processing unit-A inactive)<br>1-convolution processing unit/input buffer<br>2-activation processing unit<br>3-element-wise operations processing unit<br>4-secondary data input unit<br>5-pooling processing unit |

TABLE 4-continued

| Configuration Register | Description | Register Values |
|---|---|---|
| | | 6-invalid (self)<br>7-tensel rescale processing unit-B<br>8-15-not used |
| 7 | Selects input to Tensel Rescale Processing Unit-B | 0-disabled (tensel rescale processing unit-B inactive)<br>1-convolution processing unit/input buffer<br>2-activation processing unit<br>3-element-wise operations processing unit<br>4-secondary data input unit<br>5-pooling processing unit<br>6-tensel rescale processing unit-A<br>7-invalid (self)<br>8-15-not used |
| 8 | Selects input to Interleave Processing Unit | 0-disabled (only valid if result of hardware pass stored in convolution processing unit or passed directly to output unit)<br>1-convolution processing unit/input buffer<br>2-activation processing unit<br>3-element-wise operations processing unit<br>4-invalid<br>5-pooling processing unit<br>6-tensel rescale processingunit-A<br>7-tensel rescale processingunit-B<br>8-15-not used |

In some cases, as shown in Table 4, when a register associated with an output port of the crossbar 320 is set to a predetermined value it may indicate that the hardware processing unit or the data input unit coupled thereto is inactive or partially inactive in the hardware pass.

As described above, a software tool may be used to identify the hardware passes of the NNA to process a NN—e.g. the software tool may determine the number of hardware passes, the components that are active in each hardware pass, and the configuration of the crossbar for each hardware pass (e.g. the order in which the active components in each hardware pass process data). In some cases, such a software tool may determine that the configuration of the crossbar 320 for a hardware pass is valid, only if, when the output of a processing unit is the input to another processing unit in a hardware pass, the crossbar creates a connection between the relevant ports of the crossbar 320. For example, if the order of the processing units in the hardware pass is such that the output of the convolution processing unit 302 is to be provided as an input to the activation processing unit 304, then the configuration of the crossbar 320 may only be determined to be valid if the port of the crossbar 320 corresponding to the output of the convolution processing unit 302 is connected or coupled to the port of the crossbar 320 corresponding to the input of the activation processing unit 304. In some cases, a crossbar 320 configuration may still be valid when the output of the convolution processing unit 302 is provided as an input to the output unit even if the ports of the crossbar 320 corresponding to the convolution processing unit 302 and the output unit 318 are not connected, because, as described above, there may be a separate path between the convolution processing unit 302 and the output unit 318.

In other cases, the control information identifying the pipeline of the plurality of pipelines to be implemented by the crossbar 320 may identify the units (e.g. hardware processing units, data input units) that are active in the hardware pass and the order thereof, and the crossbar 320 may be configured to dynamically determine which input ports of the crossbar 320 to connect to which output ports of the crossbar 320 to implement the hardware pipeline defined by the identified hardware processing units and the identified order.

In some cases, each input port and each output port of the crossbar 320 may have a plurality of data channels. The number of data channels defines the number of data values that can be received on an input port in the same cycle, or transmitted on an output port in the same cycle. For example, if an input port has sixteen data channels, then 16 data values can be received on that port each cycle. In some cases, each input port and each output port of the crossbar 320 may comprise the same number of data channels (which may be referred to as XBAR_PARALLELISM). As described in more detail below, the convolution processing unit 302 may comprise a plurality of convolution engines which are each configured to perform a multiply-accumulate calculation on a set of input data values and a set of weights. In some cases, the number of channels per input/output port is equal to the number of convolution engines. For example, in some cases, the convolution processing unit 302 may comprise 28 convolution engines and each input and output port of the crossbar 320 may comprise 28 data channels. In other cases, the number of data channels per input/output port may be less than the number of convolution engines. In yet other cases, the number of data channels per input/output port may be greater than the number of convolution engines. Having the number of data channels per input/output port be greater than the number of convolution engines may allow data to be transferred between some processing units faster, particularly those processing units which comprise, or have access to, a storage module (e.g. the pooling processing unit which has access to the shared buffer). For example, such a configuration may allow data to be loaded into the shared buffer more quickly.

Each data channel of a port may have the same bit width. For example, all data channels of an input port or an output port may be 32-bits wide—i.e. each data channel of that input port or output port may be able to receive/output a 32-bit data element. In some cases, when the bit-width of the received/output data elements are less than or equal to half of the bit width of the channel, multiple data elements may be received per channel. In other words, in these cases multiple data elements may be packed into a single channel. For example, if a channel is 32-bits wide and each data element is 16 bits, then two 16-bit data elements may be received/output on that channel at a time.

In some cases, all input ports and output ports of the crossbar 320 have the same data channel bit width (e.g. 32 bits). However, in other examples, one or more of the input ports and/or output ports of the crossbar 320 may have different channel bit-widths. For example, some components (e.g. hardware processing units, data input units) may be able to produce/receive data up to a first bit width (e.g. 32 bits) whereas other components may be able to produce/receive data up to only a second, lower, bit-width (e.g. 16 bits). In these cases, a subset of the input ports and/or output ports may have data channels of the first, higher bit width (e.g. 32 bits) (i.e. those coupled or connected to the hardware processing units that produce/receive data up to the first bit width), and another subset of the input ports and/or output ports may have data channels with the second, lower, bit width (e.g. 16 bits). Reducing the bit width of the data channels of one or more input ports and/or one or more output ports of the crossbar 320 may reduce the complexity of the crossbar 320 and reduce the number of connections between components. Table 5 below illustrates an example of the maximum input and output bit-width that may be supported by the units (e.g. hardware processing units, data input units) of the NNA of FIG. 3.

TABLE 5

| Unit | Maximum Input Bit Width | Maximum Output Bit Width |
| --- | --- | --- |
| Input Buffer | 16 | 16 |
| Convolution Processing Unit | — | 32 |
| Activation Processing Unit | 16 | 16 |
| Element-Wise Operations Processing Unit | 32 | 32 |
| Secondary Data Input Unit | 16 | 16 |
| Normalisation Processing Unit | 16 | — |
| Pooling Processing Unit | — | 32 |
| Tensel Rescale Processing Unit-A | 32 | 32 |
| Tensel Rescale Processing Unit-B | 32 | 32 |
| Interleave Processing Unit | 16 | — |

Where the crossbar 320 has input and/or output ports with different bit widths, to allow a higher bit-width input port of the crossbar 320 to be coupled to a lower bit-width output port of the crossbar 320, the crossbar 320 may be configured to dynamically perform a bit-width conversion when a higher bit-width input port is coupled or connected to a lower bit-width output port of the crossbar 320. For example, in some cases, any higher-bit width input port may be coupled to logic (e.g. a clamp) that can selectively reduce the bit width of the received data elements to the lower bit width. The logic may be configured to discard the most significant bits of the higher bit width data elements. The logic (e.g. clamp) may be configured such that any higher bit-width value that is lower than the minimum in the lower bit-width is resolved to the new minimum value, and any higher-bit width value that is higher than the maximum in the lower bit-width is resolved to the new maximum.

Similarly, to allow a lower bit-width input port of the crossbar 320 to be coupled to a higher-bit width output port of the crossbar 320, the crossbar 320 may be configured to dynamically perform a bit-width conversion when a lower bit-width input port of the crossbar 320 is coupled or connected to a higher bit-width output port. For example, in some cases, any lower-bit width input port may be coupled to logic that can selectively extend the bit width of the received data element to the higher bit-width. Where the input data elements are signed then the logic may be configured to sign extend the most significant bits (MSBs) of the data elements.

As described above, each unit of the NNA (e.g. processing unit or data input unit) that is active in a hardware pass receives an input tensor and produces an output tensor. Where multiple units are active in a hardware pass then the output tensor of one unit of the NNA may be passed to another unit of the NNA via the crossbar 320. Since a unit of the NNA will often be unable to send the complete output tensor at once, there may be a predetermined order, which may be referred to herein as the processing order, in which the elements of the tensor are output from a unit. In some cases, there may be multiple processing orders which may be used by the units of the NNA. The different processing orders may provide advantages for certain operations.

Where there are multiple processing orders, some of the units of the NNA (e.g. processing units and data input units) may support only one processing order, and some of the units of the NNA (e.g. processing units and data input units) may support multiple processing orders. Where different units of the NNA may use different processing orders, the control information for a hardware pass may comprise information identifying which processing order is to be used by each active unit so that the active units can configure themselves to transmit/receive the data in accordance with the correct processing order. Example processing orders which may be supported by the units are described below with respect to FIGS. 5 to 14.

Each of the example hardware processing units of FIG. 3 will now be described. The convolution processing unit 302 is hardware configured to receive input data and weights and perform convolution operations between the input data and weight data and output the results of the convolution operations. The convolution processing unit 302 may have one or more convolution engines which are configured to perform a multiply-accumulate operation between a set of input data values and a set of weights. The weight data to be used by the convolution processing unit 302 in a hardware pass may be stored in a coefficient buffer 322. In some cases, the input data to be used by the convolution processing unit 302 in a hardware pass may be stored in an input buffer 324. An example implementation of a convolution processing unit 302 is described below with respect to FIG. 15.

The activation processing unit 304 is hardware configured to receive input data and apply a non-linear function (which may also be referred to as an activation function) thereto. Example, non-linear functions which may be implemented (or approximated) by the activation processing unit 304 include, but are not limited to, a Tanh function, a sigmoid function, a Rectified Linear Unit (ReLU) function or a leaky ReLU (LReLU) function. In a ReLU function, the output element $y_{i,j,k}$ is calculated by identifying a maximum value as set out in equation (1) wherein for x values less than 0, y=0. A LReLU function outputs the input if it is greater than zero, and outputs a fraction (e.g. 0.01x) of the input when it is negative. An example implementation of a LReLU function is set out in equation (2).

$$y_{i,j,k}=f(x_{i,j,k})=\max\{0,x_{i,j,k}\} \tag{1}$$

$$y_{i,j,k}=f(x_{i,j,k})=\max\{0.01*x_{i,j,k},x_{i,j,k}\} \tag{2}$$

In some cases, the activation function that is performed by the activation processing unit 304 in a hardware pass may be configurable. For example, in some cases, the activation processing unit 304 may receive information for a hardware pass that identifies one activation function of a plurality of activation functions that is to be applied to the input data in that hardware pass.

In some cases, the activation processing unit 304 may be configured to store, in entries of a lookup table, data representing the activation function to be implemented in the hardware pass. In these cases, the activation processing unit 304 may be configured to use the input data to lookup one or more entries in the lookup table and generate the output from the one or more entries in the lookup table and/or the input data. For example, the activation processing unit 304 may be configured to calculate the output of the activation function by interpolating between two or more entries read from the lookup table. An example implementation of an activation processing unit 304 is described in the Applicant's GB Patent No. 2552242, which is herein incorporated by reference in its entirety.

The element-wise operations processing unit 306 is hardware configured to receive input data (e.g. an input tensor) and perform an element-wise operation on the input data (e.g. input tensor), optionally with another data set (e.g. another tensor) which may be obtained or retrieved from external memory via a secondary data input unit 326. An element-wise operation is a same operation that is performed on each element of the input data/tensor (e.g. each input data value or each tensel). Element-wise operations which may be performed on the input data include, but are not limited to, add, multiply, maximum, and minimum.

The other data set/tensor may be the same size (e.g. have the same dimensions) as the input data/tensor such that corresponding elements of the two tensors are combined using an element-wise operation. Alternatively, the other data set/tensor and the input data/tensor may have a different size or dimensions. If, for example, the mismatching dimension of one of the tensors is of size 1, an element-wise operation may be performed between the input data/tensor and the other data set/tensor using a broadcast technique wherein the smaller tensor is broadcast (or expanded) to the size of the other tensor. For example, a tensor of size [N, H, W, C]=[1, 10, 1, 10] can be combined element-wise with a tensor of size [N, H, W, C]=[1, 10, 10, 10] by expanding the W dimension of the first tensor.

The normalisation processing unit 308 is hardware configured to receive input data and apply a normalisation function to the received input data to produce normalised data. Example normalisation functions which may be implemented by the normalisation processing unit 308 include, but are not limited to, a Local Response Normalisation (LRN) function and a Local Contrast Normalisation (LCN) function. In some cases, the normalisation function which is applied to the input data may be configurable. For example, the normalisation processing unit 308 may receive information for a hardware pass indicating which of a plurality of normalisation functions is to be applied to the input data in that hardware pass. This allows different normalisation functions to be applied in different hardware passes. An example implementation of a normalisation processing unit 308 is described in the Applicant's GB Patent No. 2552242, which is herein incorporated by reference in its entirety.

The pooling processing unit 310 is hardware configured to receive input data and apply a pooling function to the received input data. A pooling function is a function that reduces the size of the data by summarizing blocks or subsets of data. Example pooling functions include a maximum function, a minimum function, and an average function. The purpose of a pooling function is to reduce the spatial size of the representation to reduce the number of parameters and computations in the NN, and hence to also control overfitting.

In some cases, the pooling processing unit 310 may be configured to receive the input data in a particular format which can be generated by the normalisation processing unit 308. In such cases, as shown in FIG. 3, the input port of the pooling processing unit 310 may be coupled, or connected, to, the output port of the normalisation processing unit 308 so as to only receive input data from the normalisation processing unit 308. In these cases, to allow the input data for a hardware pass to be processed by the normalisation processing unit 308 and not the pooling processing unit 310, the pooling processing unit 310 may comprise logic (e.g. a multiplexor) which allows the pooling processing unit 310 to output either the data received from the normalisation processing unit 308 or the data generated by the pooling processing unit 310. The pooling processing unit 310 may then receive information each hardware pass indicating whether the pooling processing unit 310 is active, and if so, identifying which output is to be provided to the crossbar

320. However, it will be evident to a person of skill in the art that this is an example only, and that in other examples, the input port of the pooling processing unit 310 may be directly coupled, or connected, to the crossbar 320 to allow the pooling processing unit 310 to receive input data from other units of the NNA 300.

The interleave processing unit 312 is hardware configured to receive input data and perform a rearrangement operation to produce data that is in a particular order. The rearrangement may comprise sorting and/or transposing the received input data.

As shown in FIG. 3, the pooling processing unit 310 and the interleave processing unit 312 may each have access to a shared buffer 328 which can be used by these units to write data to and retrieve data from. For example, the shared buffer 328 may be used by these units to rearrange the order of received data or the generated data. For example, the pooling processing unit 310 and/or the interleave processing unit 312 may be configured to write data to the shared buffer and then read the same data out in a different order. In some cases, each unit may be allotted a portion of the shared buffer 328 which only that unit can access. In these cases, the pooling processing unit 310 and the interleave processing unit may only be able to read data out of the shared buffer 328 that they have written to it.

The tensel rescale processing units 314, 316 are hardware configured to perform rescaling operations on the received input data. As is known to those of skill in the art, for hardware to process a set of values, each value is represented in a number format. Two common types of number formats are fixed point number formats and floating point number formats. As is known to those of skill in the art, a fixed point number format has a fixed number of digits after the radix point (e.g. decimal point or binary point). In contrast, a floating point number format does not have a fixed radix point (i.e. it can "float"). In other words, the radix point can be placed in multiple places within the representation. While representing the network parameters (e.g. input data values, weights, biases) of a NN in a floating point number format may allow more accurate or precise output data to be produced, processing network parameters in a floating point number format in hardware is complex which tends to increase the silicon area, power consumption, memory and bandwidth consumption, and complexity of the hardware compared to hardware that processes network parameters in other formats, such as fixed point number formats. Accordingly, the NNA 300 may be configured to represent and process the network parameters of a NN in a fixed point number format to reduce the area, power consumption, memory and bandwidth consumption, and complexity of the NNA.

The NNA 300 may support one or more fixed point number formats for the network parameters (e.g. input data values, weights, bias) and the fixed point format may be configurable on a layer basis or even a partial layer basis. For example, the NNA 300 may support fixed point number formats defined by a fixed integer exponent exp and a b-bit mantissa m such that a value u is equal to $u=2^{exp}m$. In some cases, the mantissa m may be represented in two's complement format. However, in other cases other signed or unsigned integer formats may be used. When such a fixed point number format is used, the exponent exp and the number of mantissa bits b only need to be stored once for a set of values represented in that number format. Different sets of network parameters may be represented using different mantissa bit lengths m and/or different exponents b.

The NNA 300 may alternatively or additionally support an affine fixed point number format—a fixed point number format which defines an offset and a scale. An example of an affine fixed point format is the 8-bit asymmetric fixed point (Q8A) format. In one example the Q8A format is defined by a minimum representable number $r_{min}$, a maximum representable number $r_{max}$, and a zero point z, and each number is represented by an 8-bit interpolation number $d_{QbA}$. The 8-bit number $d_{QbA}$ defines a linear interpolation factor between the minimum and maximum representable numbers. In a variant of this fixed point number format the number of bits used to store the interpolation factor may be configurable on a per network parameter set basis. In this variant, where the number of bits is b, a floating point value is approximated as shown in equation (3):

$$d_{float} = \frac{(r_{max} - r_{min})(d_{QbA} - z)}{2^b - 1} \tag{3}$$

In another example the Q8A format may be defined by a zero point z which will always map exactly to 0, a scale factor and an 8-bit number. In this example, a floating point value is approximated as shown in equation (4):

$$d_{float} = (d_{Q8A} - z) * \text{scale} \tag{4}$$

Where the input data to a hardware processing unit is in an affine fixed point number format, it may be more hardware efficient for the hardware to perform the processing in a manner such that the output data does not accurately reflect the scale and/or offset. In general, it may be efficient to perform operations which may involve a change in scale in this manner. Examples of such operations include, but are not limited to, convolution operations, addition operations, and multiplication operations. In contrast, operations such as max pooling or average pooling may not be performed in this manner as the input and output scale are the same. Accordingly, the convolution processing unit which can perform convolution operations, and the element-wise operations processing unit which can perform addition and multiplication operations, may be configured to operate in this manner. Where a hardware processing unit is configured to operate in this manner, the output of the hardware processing unit may then be re-quantised to put it in the correct format.

This re-quantisation can be performed by the tensel rescale processing units 314, 316. There are many known methods and techniques for re-quantising data into an affine fixed point number format. The tensel rescale processing units 314, 316 may be configured to perform the re-quantising using any known method or technique. Since the output data of more than one active hardware processing unit may be re-quantised, having multiple tensel rescale processing units 314, 316 in the NNA 300 allows more operations to be performed in a single hardware pass.

Re-quantisation may also be used when operations involve two or more tensors in an affine fixed point number format, for example, when concatenating multiple tensors together into a single tensor, to bring them all to the same format.

Figure 1:
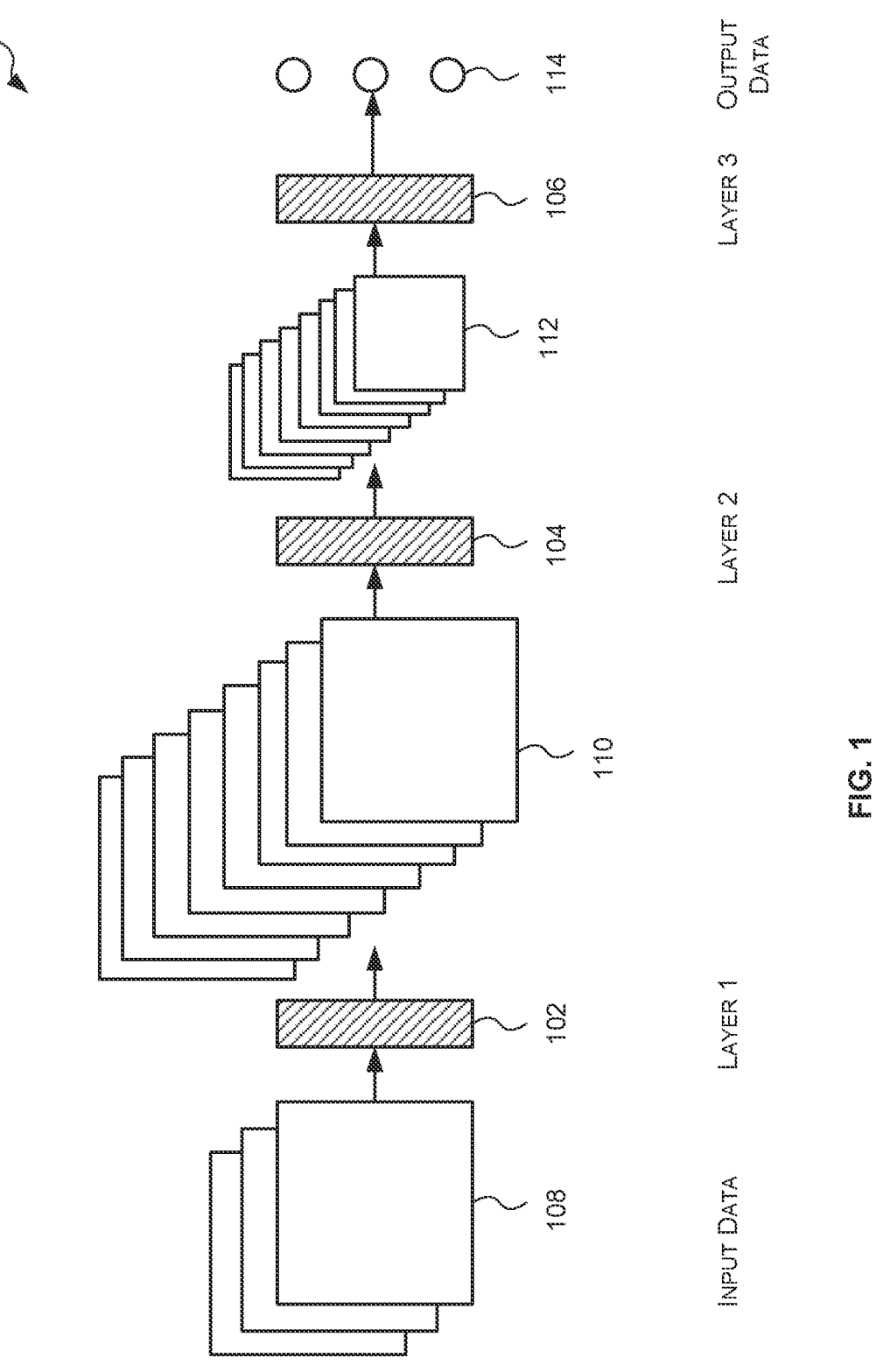
FIG. 1 is a schematic diagram of an example deep neural network (DNN)
Figure 2:
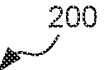
FIG. 2 is a schematic diagram illustrating performing an example convolution operation on an example tensor in a DNN.
Figure 2:
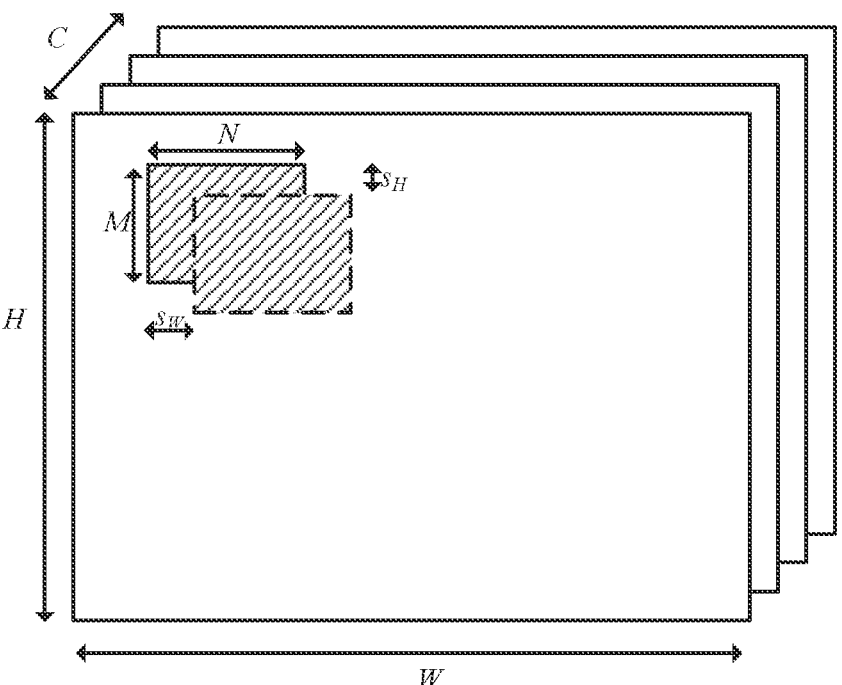

In some cases, each tensel rescale processing unit 314, 316 is configurable to perform this re-quantising on a per tensor basis or a per channel basis. As described above with respect to FIG. 2, the input data to a processing unit is typically a multi-dimensional block of data which is referred to as a tensor. Each plane of the tensor is referred to as a channel and each element of the tensor is referred to as a tensel. The tensel rescale processing units 314, 316 may be able to perform rescaling on a per-tensor basis (i.e. all of the input data values are quantised or re-quantised in the same manner)—or on a per-channel basis (i.e. each channel of the input data may be quantised or re-quantised in a different manner). In some cases, the control information for a hardware pass may specify, for any tensel rescale processing unit 314, 316 that is active in the hardware pass, whether that tensel rescale processing unit 314, 316 is to perform per-tensor or per-channel re-quantisation.

Whether or not a tensel rescale processing unit 314, 316 is configured to perform per-tensor or per-channel re-quantisation may depend on the format of the inputs to the processing module that generated the data that is sent to the tensel rescale processing unit 314, 316. For example, if the convolution processing unit 302 receives input data (e.g. an input tensor) quantised with [scale_input, offset input] and it is desirable that the output data be quantised with [scale_output, offset_output], then depending on the format of the weights, the re-quantisation process may be per channel or per tensor. For example, if all of the weights are quantised with the same parameters [scale_weights, offset_weights] then the re-quantisation may be done on a per-tensor basis. If, however, at least two of the filters are quantised using different parameters—e.g. a first filter is quantised with parameters [scale_weights1, offset_weights1] and a second filter is quantised with parameters [scale_weights2, offset_weights2]—then because each channel of the output data (e.g. output tensor) is the result of the input data (input tensor) convolved with a filter, the re-quantisation may be done on a per-channel basis. Using different quantisation parameters for different filters may allow for better quantisation of the filters, as the filter parameters can be chosen at a finer granularity. In some cases, per-channel re-quantisation may only be performed on output generated by the convolution processing unit 302.

As described above, in classical neural networks it is common to have a convolution layer followed by an activation layer. However, it is also possible for other layers to be followed by an activation layer. Where each hardware processing unit can only be used once in a hardware pass, the single activation processing unit 304 may limit the number of operations that can be processed in a single hardware pass. For example, if a neural network can be represented as a convolution operation, activation operation, pooling operation, activation operation, element-wise operation and an activation operation, if the NNA has only one activation processing unit, these operations would have to be performed in three hardware passes of the NNA—e.g. in a first hardware pass of the NNA the convolution option, first activation operation and the pooling operation could be performed, then in a second hardware pass of the NNA the second activation operation and the element-wise operation could be performed, and in a third hardware pass of the NNA the final activation operation could be performed. Accordingly, in some cases, one or more of the hardware processing units may comprise logic (e.g. a clamp) which is configured to selectively perform a ReLU operation on the data processed by that hardware processing unit. In some examples, one or more of the tensel rescale processing units 314, 316, the pooling processing unit 310 and the activation processing unit 304 may comprise logic to selectively perform a ReLU operation on the data generated by that hardware processing unit. Although the activation processing unit 304 may comprise hardware, such as a look-up table and interpolation logic, that can be configured to perform one of a plurality of activation functions on the input data/tensor, it may be more power and/or resource efficient to perform simple activation operations, such as a ReLU operation, using dedicated lower-power hardware, such as a clamp. A dedicated hardware unit for performing a ReLU operation may also increase the quality of the output as it may avoid the interpolation issues that can occur around the cut-off point. Having dedicated hardware in the activation processing unit 304 to perform a ReLU operation also allows multiple activation operations to be performed in the same hardware pass by the activation processing unit 304. Since a ReLU operation is one of the most common non-linear operations performed in a NN and relatively easy to implement in hardware, this can significantly increase the number of operations that can be performed in a single hardware pass without substantially increasing the complexity of the NNA 300.

The NNA 300 may also comprise an output unit 318 which is configured to output the processed data. For example, the output unit 318 may output the processed data to memory. In some cases, a hardware pass may be associated with an output data format and the output unit 318 may be configured to convert the processed data into the output format associated with the hardware pass prior to outputting the processed data.

Figure 4:
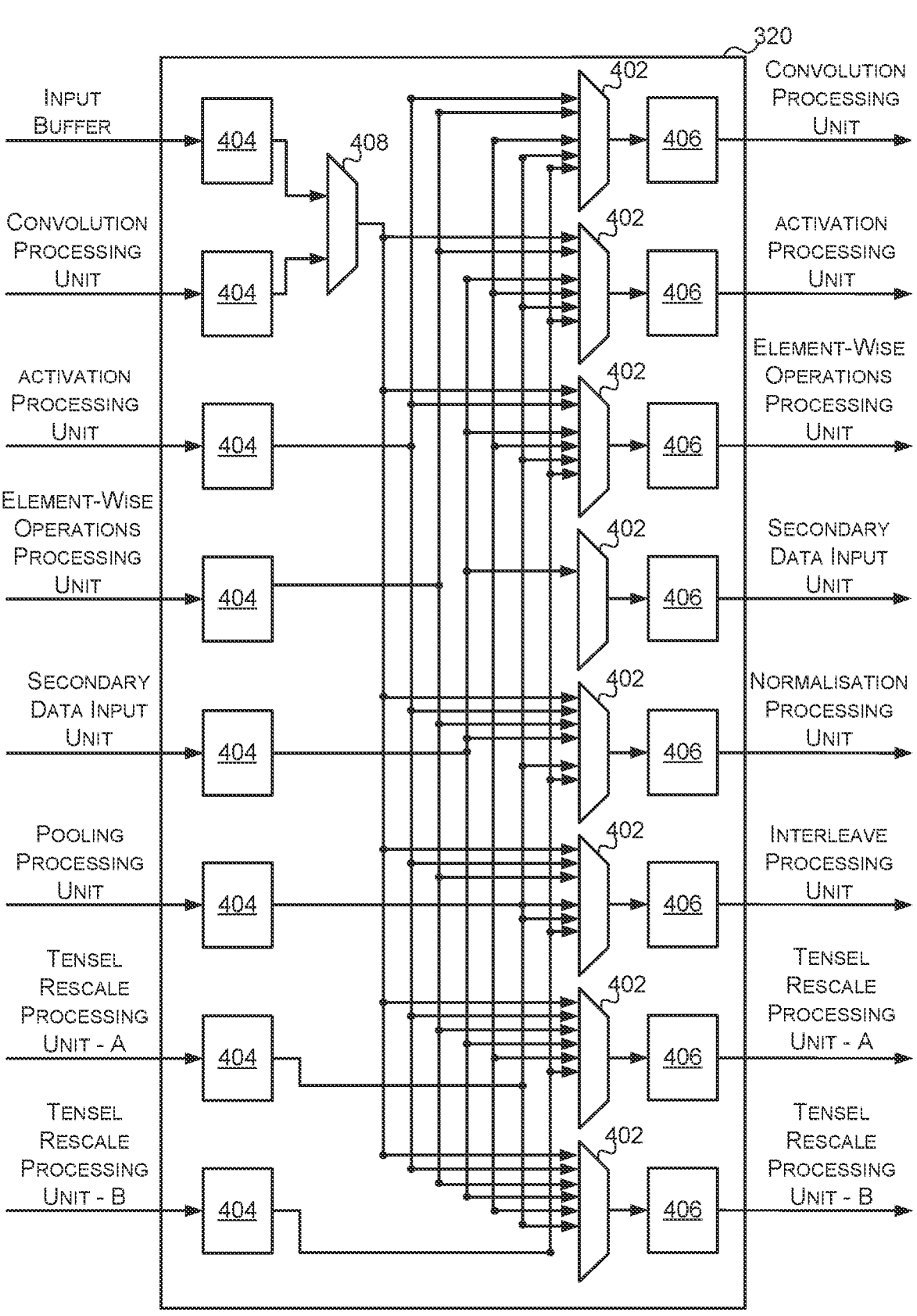
FIG. 4 is a block diagram of an example implementation of the crossbar of FIG. 3.

Reference is now made to FIG. 4 which illustrates an example implementation of the crossbar 320 of FIG. 3. The term crossbar is used herein to mean a hardware block that has a plurality of inputs, a plurality of outputs and routing, or switching, logic that can selectively couple or connect certain inputs to certain outputs. The crossbar 320 of FIG. 3 comprises a plurality of input ports, or input interfaces, (identified by an arrow pointing towards the crossbar 320), a plurality of output ports, or output interfaces, (identified by an arrow pointing away from the crossbar 320) and a plurality of multiplexors 402 that connect the input ports to the output ports.

Input ports of the crossbar 320 may be coupled to an output port of a hardware processing unit or a data input unit of the NNA, and output ports of the crossbar 320 may be coupled to an input port of a hardware processing unit or a data input unit of the NNA.

In the example shown in FIG. 4 there is a multiplexor 402 for each output port, which may be referred to as a main multiplexor or an output port multiplexer 402. Each main multiplexor 402 is coupled to the corresponding output port and controls which input port is connected or coupled to that output port. Accordingly, each main multiplexor 402 drives one of the output ports. For example, in FIG. 4 there are eight output ports and thus eight main multiplexors 402. As is known to those of skill in the art, a multiplexor ("mux") is a hardware device that can select between several input signals and forward the selected input signal to an output line. The selection is driven by one or more select signals (not shown). In the crossbar 320 of FIG. 4 the multiplexor selection signals may be generated by control logic (not shown) based on the control information (i.e. the information identifying the pipeline of the plurality of pipelines of hardware processing units to be implemented) received each hardware pass.

Each main multiplexor 402 is connected to one or more input ports of the crossbar 320. In some cases, each main multiplexor 402 may be connected to each input port of the crossbar 320 so that any input port can be connected to any output port. However, as described above with respect to FIG. 3, there may be restrictions on which input ports can be connected or coupled to which output ports. Accordingly, to simplify the crossbar 320, only a subset of the input ports may be connected to one or more of the main multiplexors 402. In some cases, each main multiplexor may only be connected to the input ports that can be connected to, or coupled to, the corresponding output port. For example, as described above, in some cases, each unit of the NNA may only be used once in a hardware pass, thus the output port of a unit of the NNA cannot be coupled to an input port of the same unit as that would involve more than one use of a unit in a hardware pass. Therefore the main multiplexor 402 for an output port of the crossbar 320 that is coupled to the input port of a unit of the NNA may not be coupled to the input port of the crossbar 320 that is coupled to the output port of that unit. For example, the multiplexor that controls the input to the convolution processing unit may not receive as an input the output of the convolution processing unit.

In some cases, the complexity of the crossbar 320 may be simplified by having one or more pre-multiplexors 408 that pre-multiplexes one or more of the input ports when it is known that only one of those inputs will be passed to an output port in a hardware pass. Specifically, by pre-multiplexing a plurality of the input ports, one or more of the main multiplexors may have one less input. For example, the NNA 300 of FIG. 3 comprises an input buffer 324 which can, in a hardware pass, either provide input data to the convolution processing unit, or provide the input data for the hardware pass to the crossbar 320, but not both. If the input buffer provides the input data for the hardware pass to the crossbar 320 then the input buffer 324 cannot provide input data to the convolution processing unit 302, thus the convolution processing unit 302 will not produce output data. If, however, the input buffer provides input data to the convolution processing unit 302 then the convolution processing unit 302 may provide output data (in some cases it may store the generated data for a subsequent hardware pass). Accordingly, in a hardware pass only one of the convolution processing unit 302 and the input buffer 324 may provide data to the crossbar 320. Therefore both input ports do not need to be coupled to the main multiplexors 402.

In some cases, as shown in FIG. 4, the crossbar 320 may comprise a register or a set of registers 404 coupled to each input port to buffer the input data received from the other units of the NNA, and/or a register or a set of registers 406 coupled to each output port to buffer the data sent to the other units of the NNA. In these cases, the other units (e.g. processing units and data input units) may have corresponding registers on their input and output ports. Where an input port or an output port is configured to receive and/or send data using handshaking signals, the corresponding register(s) may also be configured to store/buffer the handshaking information.

As described above, each unit of the NNA (e.g. processing unit or data input unit) may be configured to output or receive the elements of a tensor in a predetermined order (i.e. a processing order). Some units may only support one processing order for receiving and/or transmitting a tensor (i.e. some units may be configured to receive a tensor in accordance with a single processing order and/or transmit a tensor in accordance with a single processing order) whereas other units may support multiple processing orders for receiving and/or transmitting a tensor (i.e. some units may be configured to receive a tensor in accordance with any of a plurality of processing orders and/or transmit a tensor in accordance with any of a plurality of processing orders). The processing order(s) that are supported by a unit for receiving a tensor may be different than the processing order(s) supported by that unit for transmitting a tensor. For example, a unit may be able to receive a tensor in accordance with a first processing order, and transmit a tensor in accordance with a second, different processing order. Reference is now made to FIGS. 5 to 14 which illustrate example processing orders which may be used to transmit a tensor to another component via the crossbar 320.

Figure 5:
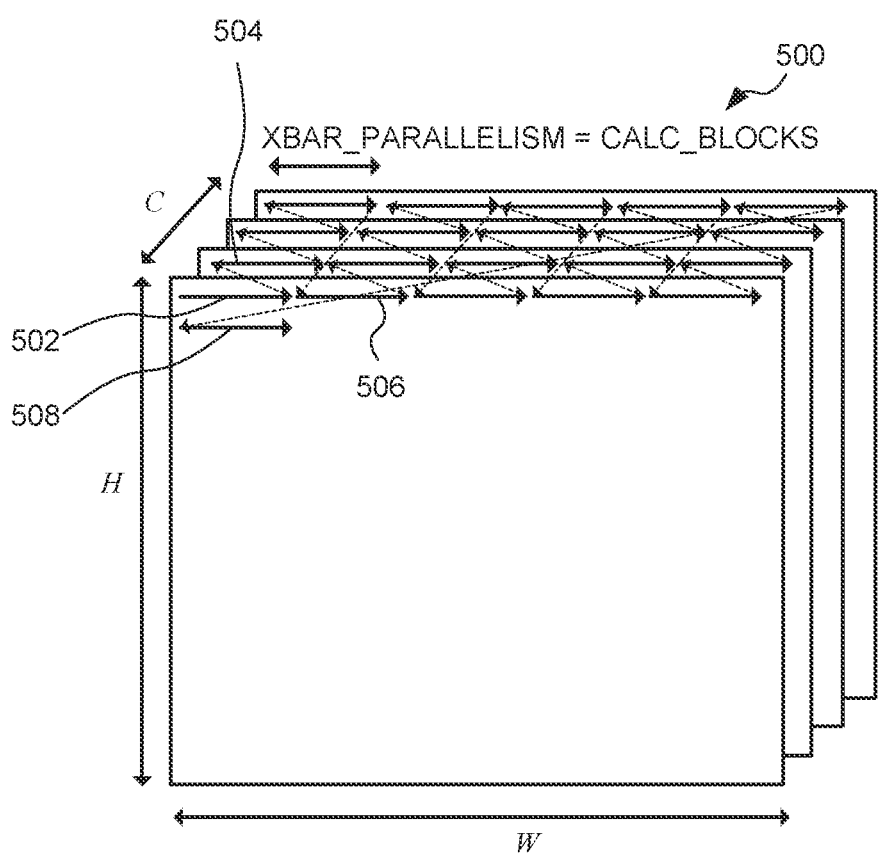
FIG. 5 is a schematic diagram illustrating a first example tensor processing order.

Specifically, FIG. 5 illustrates a first example processing order, which may be referred to as the front end processing order, which may be used to transmit a tensor via the crossbar 320. In FIG. 5, the elements of the tensor 500 are transmitted in blocks or sets of elements. A set of elements that are transmitted together may be referred to as a transaction. Each set of elements that are transmitted together are identified in FIG. 5 by a solid arrow. The order the sets of elements are transmitted is identified by dotted lines. Specifically, after a set of elements is transmitted the set of elements linked to that set of elements by a dotted line is transmitted. For example, after the set of elements or block 502 is transmitted, the set of elements or block 504 is transmitted. It is noted that all of the sets of elements of the tensor 500 that are transmitted are not explicitly identified in FIG. 5. Specifically, after the set of elements or block 508 is transmitted, further sets of elements or blocks are transmitted. It will be evident to a person of skill in the art, from the description herein, the order in which the remaining elements of the tensor 500 are transmitted. If the tensor 500 can be described as having a width W, height H, and number of channels or planes C (which may also be referred to as the depth) as shown in FIG. 5, then in the front end processing order the elements of a tensor are transmitted in plane order, width order, then height order.

As described above, each input and output port of the crossbar 320 may have a fixed number of data channels (XBAR_PARALLELISM). The number of data channels defines the number of elements of a tensor that can be sent or received in the same cycle. Where the number of channels per port (XBAR_PARALLELISM) is equal to the number of convolution engines (CALC_BLOCKS) of the convolution processing unit 302 then transmitting a tensor in accordance with the front end processing order may be described by the example method 600 of FIG. 6.

The method 600 begins at step 602 where a width counter value w, a height counter value h, and a plane counter value c are initialised to 0. The method 600 then proceeds to step 604 where a block of XBAR_PARALLELISM elements of the tensor 500 is transmitted (e.g. block 502 of FIG. 5). The block of elements comprises elements at different width positions (width positions w to w+(XBAR_PARALLELISM-1)), the same height position (h) and the same plane (c) (e.g. block 502 of FIG. 5). The method 600 then proceeds to step 606 where it is determined whether the tensor 500 comprises another plane (e.g. is (C−1)>c?). If it is determined that the tensor 500 comprises another plane, then the method 600 proceeds to step 608. If, however, it is determined that the tensor 500 does not comprise another plane then the method 600 proceeds to step 610.

At step 608, one or more of the counters are adjusted to move to the next plane. This may comprise incrementing the plane counter c by one (e.g. c=c+1). Once the plane counter has been incremented the method 600 proceeds back to step 604 where a block of XBAR_PARALLELISM elements of the tensor from the next plane that correspond to the same width positions (width positions w to w+(XBAR_PARALLELISM-1)) and the same height position (h) (e.g. block 504 of FIG. 5) is transmitted. Accordingly, step 604 is repeated for each plane until the same block of XBAR_PARALLELISM elements from each plane have been transmitted.

At step 610, once it has been determined that the same block of XBAR_PARALLELISM elements of the tensor 500 have been transmitted for all planes, it is determined whether the tensor 500 has more elements in the width dimension at the same height position (h) (e.g. is (W−1)> (w+(XBAR_PARALLELISM−1))?). If it is determined that the tensor 500 has more elements in the width dimension at the same height position (h), then the method 600 proceeds to step 612. If, however, it is determined that the tensor 500 does not have any more elements in the width dimension at the same height (h), then the method 600 proceeds to step 614.

At step 612, one or more of the counters are adjusted to start transmitting the elements at the next width position, starting with the first plane. This may comprise incrementing the width counter w by XBAR_PARALLELISM (e.g. w=w+XBAR_PARALLELISM), and setting the plane counter c back to zero (e.g. c=0). The method 600 then proceeds back to step 604 where a block of XBAR_PARALLELISM elements of the tensor 500 from the first plane at the next width positions (e.g. width positions w to w+(XBAR_PAR-ALLELISM−1)) and the same height position (h) (e.g. block 506 of FIG. 5) is transmitted. Accordingly steps 610 and 612 iterate through each block of XBAR_PARALLELISM elements at the same height position (e.g. same row).

At step 614, once it has been determined that a whole row of elements of the tensor for all planes have been transmitted, it is determined whether the tensor has more elements in the height dimension (e.g. is (H−1)>h?). If it is determined that the tensor 500 has more elements in the height dimension, then the method 600 proceeds to step 616. If, however, it is determined that the tensor 500 does not have any more elements in the height dimension then the method 600 ends.

At step 616, one or more of the counters are adjusted to start transmitting elements from the next row, starting with the first plane. This may comprise incrementing the height counter h by one (e.g. h=h+1), and setting the width and plane counters w and c back to zero (i.e. w=0, c=0). The method 600 then proceeds back to step 604 where the first block of the next row (e.g. block 508 of FIG. 5) is transmitted. Accordingly, the method 600 of FIG. 6 iterates through the planes, width and then the height of the tensor.

Figure 6:
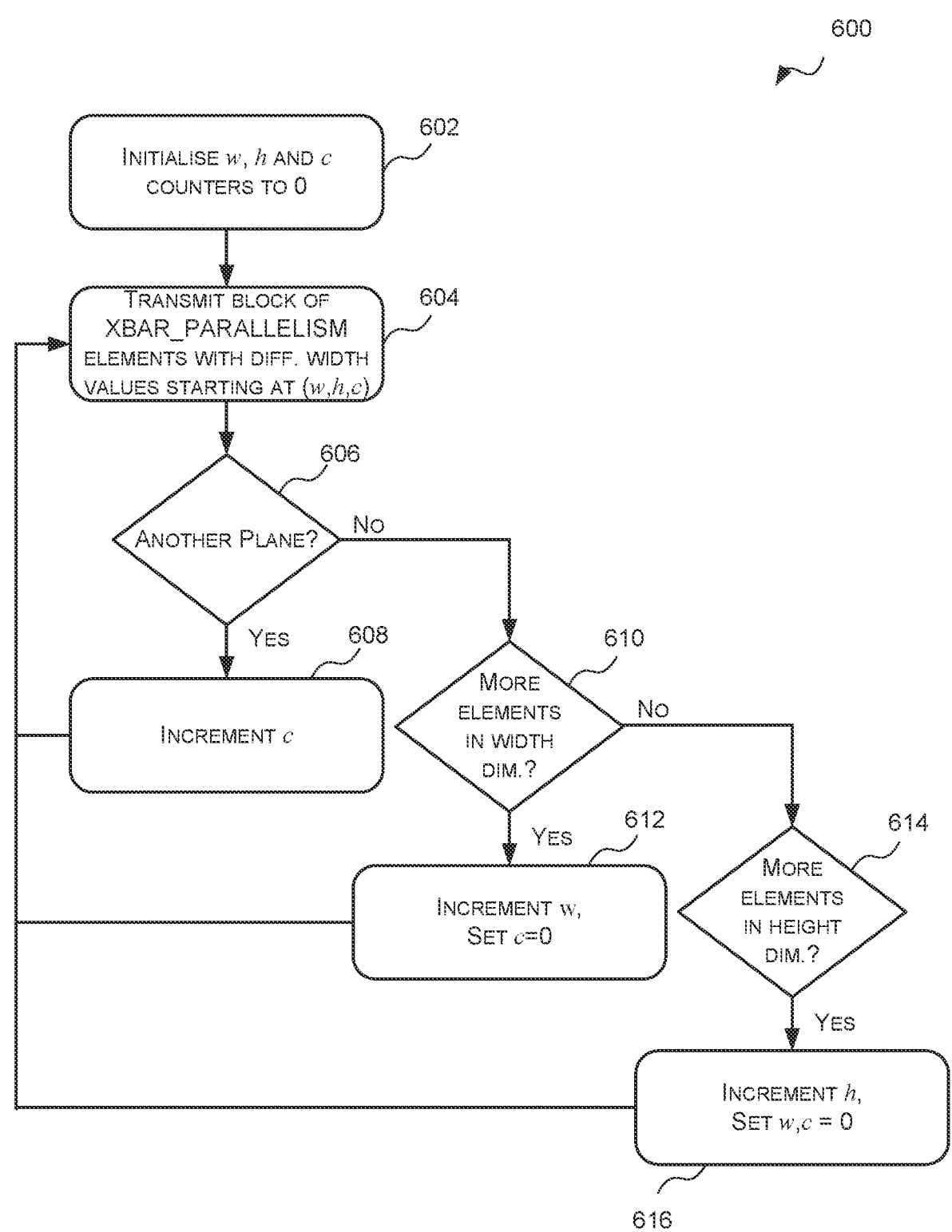
FIG. 6 is a flow diagram of an example method of transmitting a tensor in accordance with the tensor processing order of FIG. 5.

The example method 600 of FIG. 6 describes the front end processing order when the number of data channels of each port of the crossbar 320 (XBAR_PARALLELISM) is equal to the number of convolution engines in the convolution processing unit (CALC_BLOCKS). Where the number of data channels of each port of the crossbar 320 is less than the number of convolution engines then the next block of elements in the same row may be transmitted before moving to the next channel. For example, where the number of convolution engines is double the number of data channels per port of the crossbar 320 (i.e. CALC_BLOCKS=2*XBAR_PARALLELISM), block 506 of the tensor 500 of FIG. 5 may be transmitted prior to block 504 of FIG. 5. This is illustrated in FIG. 7.

Figure 7:
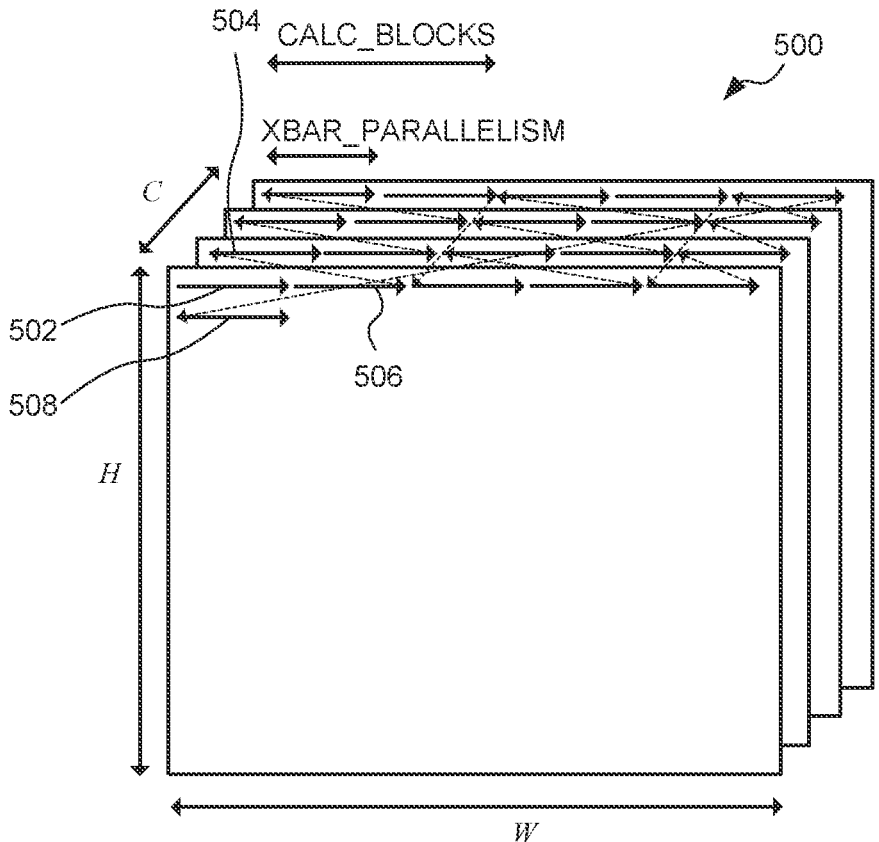
FIG. 7 is a schematic diagram illustrating a variant of the example tensor processing order of FIG. 5.

The front end processing order described with respect to FIGS. 5-7 has proven efficient when performing a convolution operation. This is because it allows the data to be provided to the convolution engines in an efficient manner. Specifically, as described in the Applicant's GB Patent 2568086, which is herein incorporated by reference, it allows the same filter to be applied to a plurality of windows of the input data in parallel. Then the input data can remain static while different filters are applied to that input data. This can save power in loading the input data into the convolution engines. Generally, the more filters that are applied to the input tensor, the more the power savings.

Figure 8:
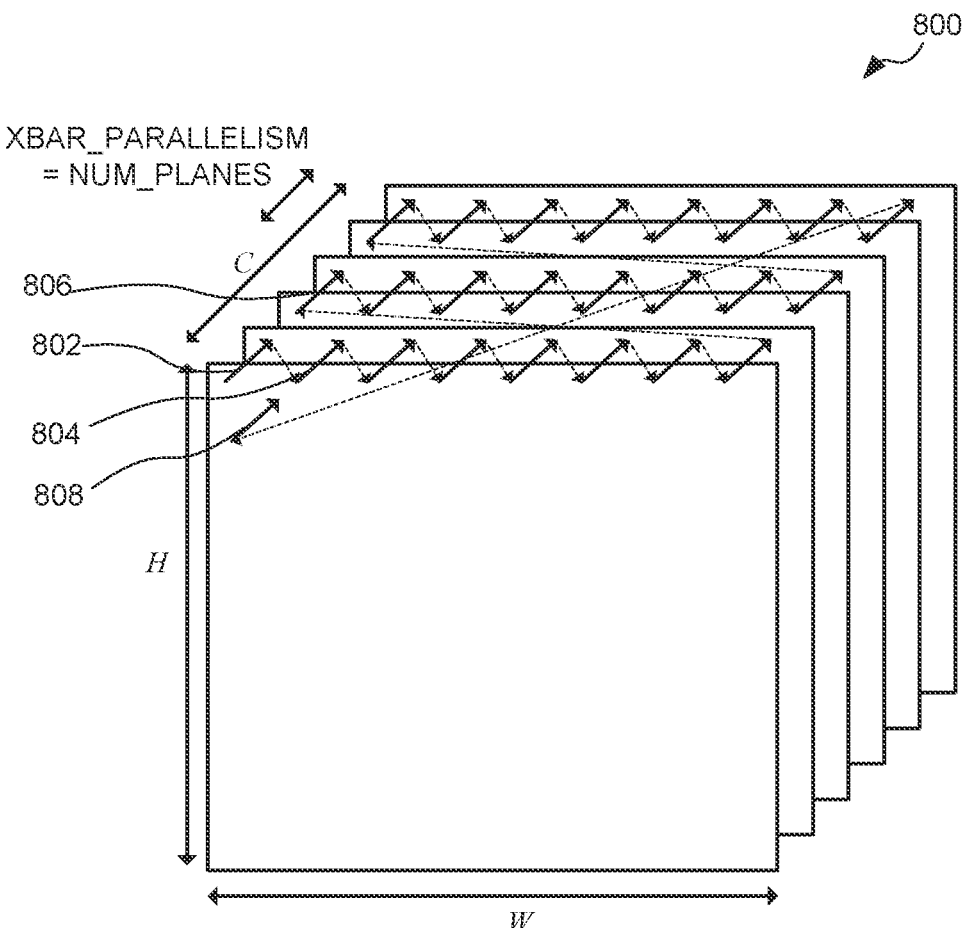
FIG. 8 is a schematic diagram illustrating a second example tensor processing order.

FIG. 8 illustrates a second example processing order, which may be referred to as the back end processing order, which may be used to transmit a tensor via the crossbar 320. In FIG. 8, the elements of the tensor 800 are transmitted in blocks or sets of elements. A set of elements that are transmitted together may be referred to as a transaction. Each set of elements that are transmitted together are identified in FIG. 8 by a solid arrow. The order the sets of elements are transmitted is identified by dotted lines. Specifically, after a set of elements is transmitted the set of elements linked to that sets of elements by a dotted line is transmitted. For example, after the set of elements or block 802 is transmitted, block 804 is transmitted. It is noted that all of the sets of elements of the tensor 800 that are transmitted are not explicitly identified in FIG. 8. Specifically, after the set of elements or block 808 is transmitted further sets or elements or blocks are transmitted. It will be evident to a person of skill in the art, from the description herein, the order in which the remaining elements of the tensor 800 are transmitted. If the tensor 800 can be described as having a width W, height H, and number of channels or planes C (which may also be referred to as the depth) as shown in FIG. 8, then in the back end processing order the elements of a tensor are transmitted in width order, plane order, then height order.

As described above, each input and output port of the crossbar 320 may have a fixed number of data channels (XBAR_PARALLELISM). The number of data channels defines the number of elements of a tensor that can be sent or received in the same cycle. Also, as described above, the shared buffer may have a maximum number of planes (NUM_PLANES) of a single position that can be stored at the same time. In some cases, NUM_PLANES may be equal to 16, however, it will be evident to a person of skill in the art that this is an example only. Where the number of channels per port of the crossbar 320 (XBAR_PARALLEL-ISM) is equal to the maximum number of planes (NUM_PLANES) of the shared buffer 328 then transmitting a tensor in accordance with the back end processing order may be described by the example method 900 of FIG. 9.

The method 900 begins at step 902 where a width counter value w, height counter value h and plane counter value c are initialised to 0. The method 900 then proceeds to step 904 where a block of XBAR_PARALLELISM elements of the tensor 800 is transmitted. The block of elements comprises elements in different planes (planes c to c+(XBAR_PAR-ALLELISM−1)), at the same height position (h) and the same width position (w) (e.g. block 802 of FIG. 8). The method 900 then proceeds to step 906 where it is determined whether the tensor 800 comprises more elements in the width dimension at the same height (h) (e.g. is (W−1)>w?). If it is determined that the tensor 800 comprises more elements in the width dimension at the same height (h) then the method 900 proceeds to step 908. If, however, it is determined that the tensor 800 does not comprise more elements in the width dimension then the method 900 proceeds to step 910.

At step 908, one or more of the counters are adjusted to move to the next width position. This may comprise incrementing the width counter w by one (e.g. w=w+1) and the method 900 proceeds back to step 904 where a block of XBAR_PARALLELISM elements of the tensor from the next width position, of the same planes (planes c to c+(XBAR_PARALLELISM−1)) and the same height position (h) (e.g. block 804 of FIG. 8) is transmitted. Accordingly, step 904 is repeated for each width position until the same block of XBAR_PARALLELISM elements from each width position have been transmitted.

At step 910, once it has been determined that the same block of XBAR_PARALLELISM elements of the tensor 800 have been transmitted for all width positions, it is determined whether the tensor 800 has more planes (e.g. is (C−1)>(c+(XBAR_PARALLELISM−1)?). If it is determined that the tensor 800 has more planes, then the method 900 proceeds to step 912. If, however, it is determined that the tensor 800 does not have any more planes, then the method 900 proceeds to step 914.

At step 912, one or more of the counters is adjusted to move to the next set of channels. This may comprise incrementing the plane counter c by XBAR_PARALLEL-ISM (e.g. c=c+XBAR_PARALLELISM), and setting the width counter w back to zero (e.g. w=0). The method 900 then proceeds back to step 904 where a block of XBAR_PARALLELISM elements of the tensor 800 from the next set of planes (e.g. planes c to c+(XBAR_PARAL-LELISM−1)) at the weight and height positions (w, h) (e.g. block 806 of FIG. 8) is transmitted.

At step 914, once it has been determined that a whole row of elements of the tensor 800 for all planes have been transmitted, it is determined whether the tensor has more elements in the height dimension (e.g. is (H−1)>h? or is there another row?). If it is determined that the tensor 800 has more elements in the height dimension, then the method 900 proceeds to step 916. If, however, it has been determined that the tensor 800 does not have any more elements in the height dimension then the method 900 ends.

At step 916, one or more of the counters is adjusted to move to the next row, starting at the first plane and first width position. This may comprise adjusting the height counter h by one (e.g. h=h+1), and setting the width and plane counters w and c back to zero (i.e. w=0, c=0). The method 900 then proceeds back to step 904 where the first block of the next row (e.g. block 808 of FIG. 8) is trans-mitted. Accordingly, the method 900 of FIG. 9 iterates through the width, planes and then the height of the tensor 800.

Figure 9:
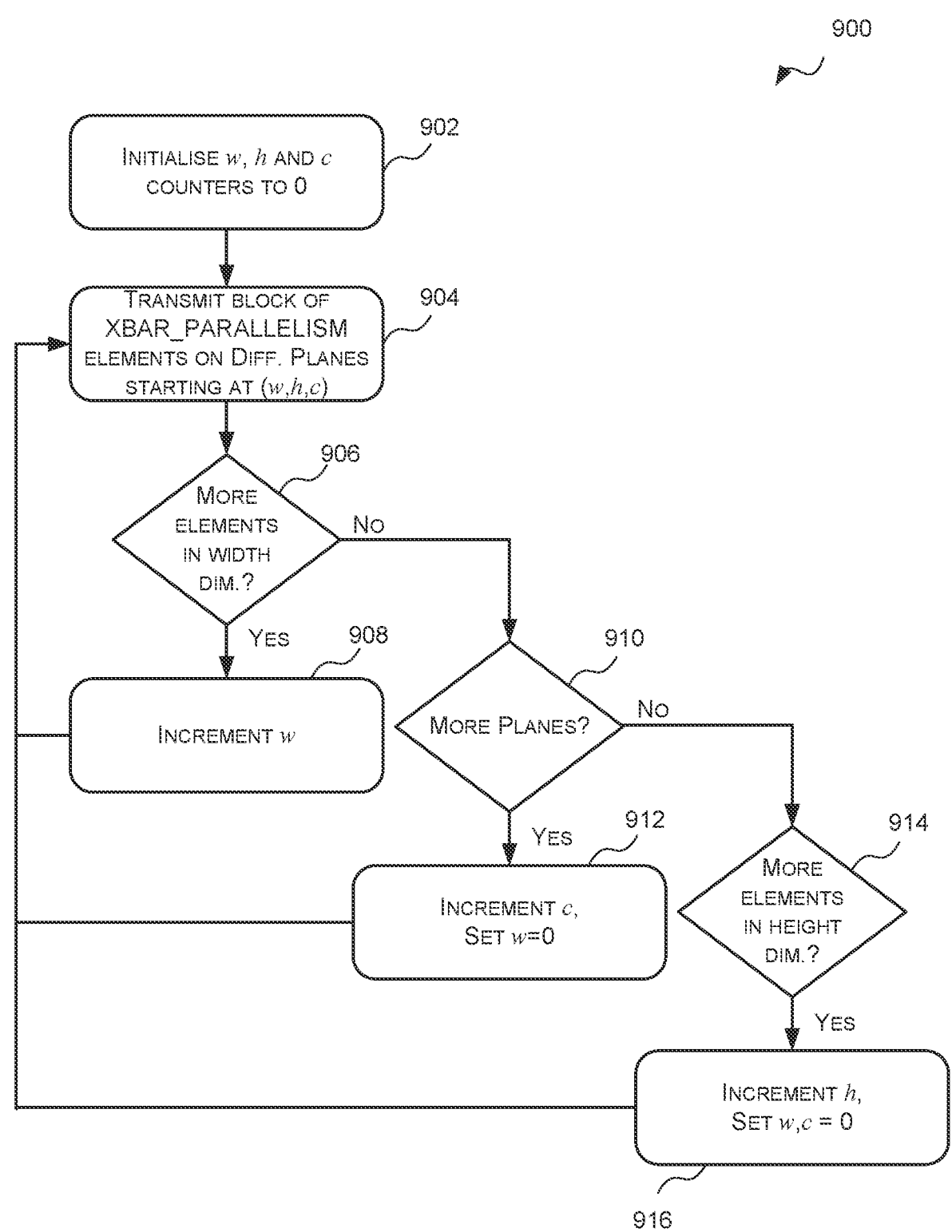
FIG. 9 is a flow diagram of an example method of transmitting a tensor in accordance with the tensor processing order of FIG. 8.

The example method 900 of FIG. 9 describes the back end processing order when the number of data channels of each port of the crossbar 320 (XBAR_PARALLELISM) is equal to the number of planes that can be stored together in the shared buffer. Where the number of data channels of each port of the crossbar 320 is less than the number of planes then the elements in the same row and column of the next set of planes may be transmitted before moving to the next row (i.e. before moving to the next width position). For example, where the number of planes is double the number of data channels per port of the crossbar 320 (i.e. NUM_PLANES=2*XBAR_PARALLELISM), block 806 of the tensor 800 of FIG. 8 may be transmitted prior to block 804 of FIG. 8. This is illustrated in FIG. 10.

Figure 10:
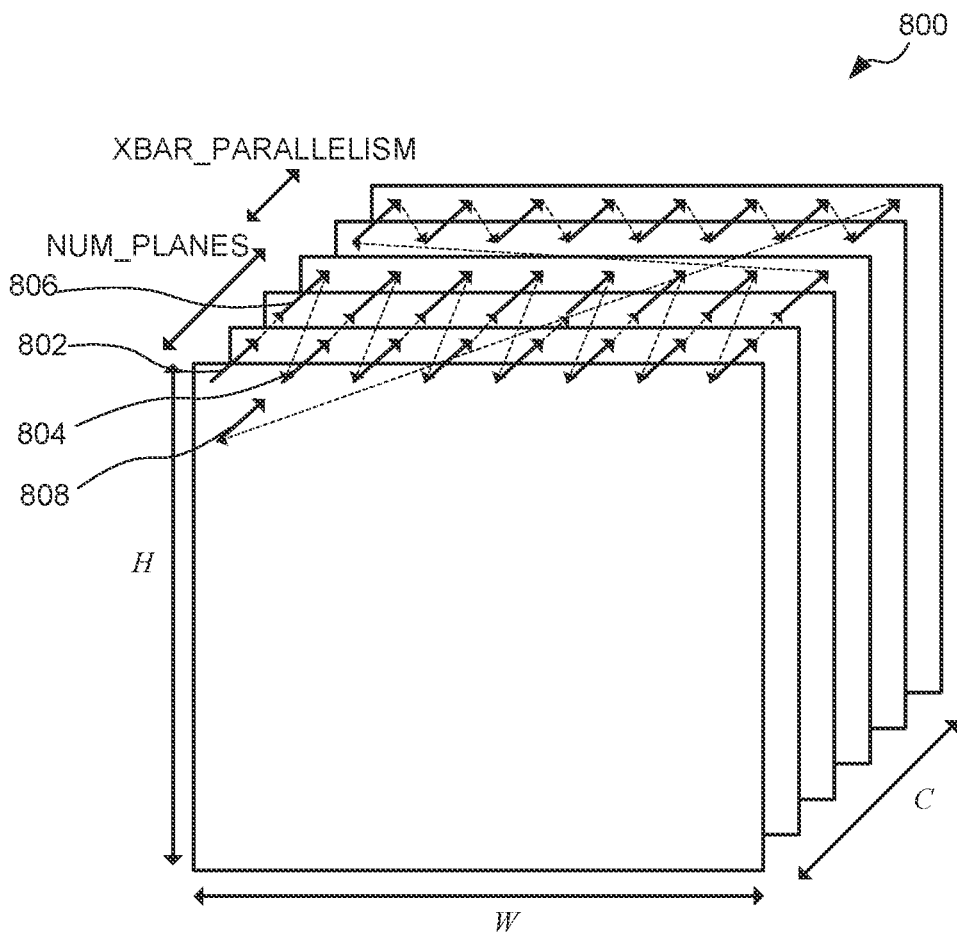
FIG. 10 is a schematic diagram illustrating a variant of the example tensor processing order of FIG. 8.

The back end processing order described with respect to FIGS. 8 to 10 has proven efficient for performing 2D pooling operations because 2D pooling operations are planar (i.e. they are applied on a channel basis). By moving in raster order (i.e. back end processing order), it makes it possible to re-use column results for contiguous calculations for a whole row or line.

FIG. 11 illustrates a third example processing order, which may be referred to as the normalisation partial back end processing order, which may be used by one or more of the components of the NNA to transmit a tensor via the crossbar 320. In FIG. 11, the elements of the tensor 1100 are transmitted in blocks or sets of elements. A set of elements that are transmitted together may be referred to as a trans-action. Each set of elements that are transmitted together are identified in FIG. 11 by a solid arrow. The order the sets of elements are transmitted is identified by dotted lines. Spe-cifically, after a set of elements is transmitted, the set of elements linked to that sets of elements by a dotted line is transmitted. For example, after the set of elements or block 1102 is transmitted, block 1104 is transmitted. It is noted that all of the sets of elements of the tensor 1100 that are transmitted are not explicitly identified in FIG. 11. Specifi-cally, after the set of elements starting at point 1108 is transmitted further sets or elements or blocks are transmit-ted. It will be evident to a person of skill in the art, from the description herein, the order in which the remaining ele-ments of the tensor 1100 are transmitted. If the tensor 1100 can be described as having a width W, height H, and number of channels or planes C (which may also be referred to as the depth) as shown in FIG. 11, then in the normalisation back end processing order the elements of a tensor are transmitted in width order, plane order, then height order, however only a predetermined number (e.g. CALC_BLOCKS) of different width positions are transmitted before moving to the next set of planes.

As described above, the shared buffer may have a maxi-mum number of planes (NUM_PLANES) of a single posi-tion that can be stored at the same time. In some cases, NUM_PLANES may be equal to 16, however, it will be evident to a person of skill in the art that this is an example only. Where the number of channel positions that can be transmitted at the same time is equal to NUM_PLANES, and the predetermined number of different width positions is equal to CALC_BLOCKS (i.e. the number of convolution engines), transmitting a tensor in accordance with the nor-malisation partial back end processing order may be described by the example method 1200 of FIG. 12.

The method 1200 begins at step 1202 where a width counter value w, height counter value h and plane counter value c are initialised to 0. The method 1200 then proceeds to step 1204 where a block of NUM_PLANES elements of the tensor 1100 is transmitted. The block of elements com-prises elements in different planes (planes c to c+(NUM_PLANES−1)), at the same height position (h) and the same width position (w) (e.g. block 1102 of FIG. 11). If there are less elements in the channel dimension than can be transmitted at the same time (e.g. as part of the same transaction) then dummy values may be sent for the remain-ing values so that NUM_PLANES elements are sent. In such cases, the transmitter may notify the receiver which ele-ments are invalid or should not be used. The method 1200 then proceeds to step 1206 where it is determined whether a block of NUM_PLANES elements have been sent for CALC_BLOCKS different width (w) positions for the same set of planes. It may be determined that a block of NUM_PLANES elements have been sent for CALC_BLOCKS different width (w) positions for the same set of planes if (w+1) mod (CALC_BLOCKS)=0 (i.e. when (w+1) is an integer multiple of CALC_BLOCKS). If it is determined that that a block of NUM_PLANES elements have not been sent for CALC_BLOCKS different width (w) positions for the same set of planes, then the method 1200 proceeds to step 1208. If, however, it is determined that a block of NUM_PLANES elements have been sent for CAL-C_BLOCKS different width (w) positions for the same set of planes then the method 1200 proceeds to step 1212.

At step 1208, it is determined whether the tensor 1100 comprises more elements in the width dimension at the same height (h) (e.g. is (W−1)>w?). If it is determined that the tensor 1100 comprises more elements in the width dimension at the same height (h) then the method 1200 proceeds to step 1210. If, however, it is determined that the tensor 1100 does not comprise more elements in the width dimension (i.e. the end of the current row has been reached) then the method 1200 proceeds to step 1212.

At step 1210, one or more of the counters are adjusted to move to the next width position. This may comprise incrementing the width counter w by one (e.g. w=w+1) and the method 1200 proceeds back to step 1204 where a block of NUM_PLANES elements of the tensor from the next width position, of the same planes (planes c to c+(NUM_PLANES−1)) and the same height position (h) (e.g. block 1104 of FIG. 11) is transmitted. Accordingly, step 1204 is repeated for each width position until the same block of NUM_PLANES elements have been transmitted for CALC_BLOCKS width (w) positions, or the end of the current row has been reached.

At step 1212, once it has been determined that same block of NUM_PLANES elements have been transmitted for CALC_BLOCKS width (w) positions for the same set of planes, or the end of the current row has been reached, it is determined whether the tensor 1100 has more planes (e.g. is (C−1)>(c+(NUM_PLANES−1)?). If it is determined that the tensor 1100 has more planes, then the method 1200 proceeds to step 1214. If, however, it is determined that the tensor 1100 does not have any more planes, then the method 1200 proceeds to step 1216.

At step 1214, one or more of the counters are adjusted to move to the next set of planes. This may comprise incrementing the plane counter c by NUM_PLANES (e.g. c=c+ NUM_PLANES), and decrementing the width counter w so as to point to the beginning of the block of up to CALC_BLOCKS width (w) positions (e.g. w=w−(w mod (CALC_BLOCKS)). The method 1200 then proceeds back to step 1204 where a block of NUM_PLANES elements of the tensor 1100 from the next set of planes (e.g. planes c to c+(NUM_PLANES−1)) at the width and height positions (w, h) (e.g. block 1106 of FIG. 11) is transmitted. In other words, if CALC_BLOCK is equal to 4 as shown in FIG. 11, then after the same block of NUM_PLANES elements have been transmitted for four different width positions (and the same height), then NUM_PLANES elements are sent for the same four width positions for a new set of channels.

At step 1216, once it has been determined that all planes for a set of w positions in the same row (i.e. same h position) have been transmitted, it is determined whether there are more elements in the width (w) dimension (e.g. is (W−1)>w?)). In other words, it is determined whether to move to the next set of width (w) positions. If it is determined that the tensor 1100 comprises more elements in the width dimension at the same height (h) then the method 1200 proceeds to step 1218. If, however, it is determined that the tensor 1100 does not comprise more elements in the width dimension (i.e. all of the elements in the same row for all planes/channels have been sent) then the method 1200 proceeds to step 1220.

At step 1218, once it has been determined that all of the elements for a set of width (w) positions for all planes/channels have been sent, the width counter w is incremented by one (i.e. w=w+1) and the plane counter c is set back to zero (i.e. c=0). The method 1200 then proceeds back to step 1204 where a block of NUM_PLANES elements in different planes (planes c to c+(NUM_PLANES−1)), at the same height position (h) and at the next width position (w) are transmitted.

At step 1220, once it has been determined that a whole row of elements of the tensor 1100 for all planes/channels have been transmitted, it is determined whether the tensor 1100 has more elements in the height dimension (e.g. is (H−1)>h? or is there another row?). If it is determined that the tensor 1100 has more elements in the height (h) dimension (i.e. there is another row), then the method 1200 proceeds to step 1222. If, however, it has been determined that the tensor 1100 does not have any more elements in the height dimension (i.e. there are no more rows) then the method 1200 ends.

At step 1222, one or more of the counters are adjusted to move to the next row, starting at the first width position and first plane. This may comprise incrementing the height counter h by one (e.g. h=h+1), and setting the width and plane counters w and c back to zero (i.e. w=0, c=0). The method 1200 then proceeds back to step 1204 where the first block of the next row (e.g. the block starting at 1108 of FIG. 11) is transmitted. Accordingly, the method 1200 of FIG. 12 iterates through the width, planes and then the height of the tensor 1100, however, unlike the back end processing order illustrated by the method 900 of FIG. 9, only NUM_PLANES different width positions are sent before elements from the next set of planes are sent.

FIG. 13 illustrates a fourth example processing order, which may be referred to as the rasterized front end processing order, which may be used by one or more of the components of the NNA to transmit a tensor via the crossbar 320. In the example shown in FIG. 13 a set of elements of the tensor 1300 that are transmitted/received together (e.g. as part of the same transaction) are indicated by a solid arrow. For example, the arrow from a to b represents a set of elements of the tensor 1300 that are transmitted together (e.g. as part of a transaction). The order in which the sets of elements are transmitted are indicated by letters. Specifically, the start and end of each set of elements (e.g. each transaction) is identified by a letter (e.g. a and b). After that set of elements is transmitted, the set of elements in which the letter identifying the start of the set of elements matches the letter identifying the end of the set of elements most recently transmitted. For example, after the set of elements identified by letters (a,b) have been transmitted, the set of elements identified by letters (b, c) is transmitted. Similarly, after the set of elements identified by letters (e, f) is transmitted, the set of elements identified by letters (f, g) is transmitted.

If the tensor 1300 can be described as having a width W, height H, and number of channels or planes C (which may also be referred to as the depth) as shown in FIG. 13, then in the normalisation back end processing order the elements of a tensor are transmitted in plane order, width order, then height order, however, unlike the front end order described with respect to FIGS. 5-6, elements from different rows of the tensor may be transmitted at the same time (i.e. as part of the same transaction). Specifically, instead of padding the set of elements with dummy values when there are less than XBAR_PARALLELISM elements left in a row, the remaining elements are selected from the start of the next row. For example, as shown in FIG. 13, when reaching point "I" in the rasterized front end processing order where there are less elements in the current row than can be transmitted in a single transaction (e.g. there are less then XBAR_PARLLELISM elements in the current row), instead of only transmitting elements from l to m, X elements from the next row (i.e. elements from m to n) are transmitted, where X+elements l to m=XBAR_PARALLELISM. A transaction that spans multiple rows of the tensor is shown in two parts and the parts are connected by a circle and a letter. Transmitting a tensor in accordance with this processing order can improve throughput, but may be more complicated to implement.

The transmission of elements of a tensor in accordance with the rasterized front end processing order can be described by the method 1400 of FIG. 14.

The method 1400 begins at step 1402 where a width counter value w, a height counter value h, a plane counter value c and a next row width counter value $w_1$ are initialised to 0. The method 1400 then proceeds to step 1404.

At step 1404, it is determined whether there are at least XBAR_PARALLELISM elements left in the current row (i.e. is w+XBAR_PARALLELISM≤W?). If it is determined that there are at least XBAR_PARALLELISM elements left in the current row (i.e. row h) then the method proceeds to step 1406. However, if it is determined that there are not at least XBAR_PARALLELISM elements left in the current row (i.e. row h) then the method proceeds to step 1408.

At step 1406, after it has been determined that there are at least XBAR_PARALLELISM elements left in the current row, a block of XBAR_PARALLELISM elements of the tensor 1300 is transmitted. The block of elements comprises elements at different width positions (width positions w to w+(XBAR_PARALLELISM−1)), the same height position (h) and the same plane (c) (e.g. block 1302 of FIG. 13). Once this block of elements of the tensor has been transmitted the method 1400 proceeds to step 1416.

At step 1408, after it has been determined that there are less than XBAR_PARALLELISM elements left in the current row, it is determined whether there is another row in the tensor (e.g. is h<(H−1)?). If it is determined that there is not another row in the tensor, then the method 1400 proceeds to step 1410 where the remaining elements in the row are transmitted. The set of elements transmitted may be padded (e.g. with dummy values) so that XBAR_PARALLELISM elements are transmitted. In such cases, information may be transmitted to the receiver indicating which elements are invalid or are not to be used. If, however, it is determined that there is another row in the tensor then the method 1400 proceeds to steps 1412 and 1414 where the remaining elements in the current row are transmitted along with the first X elements of the next row, where X+the elements remaining in current row=XBAR_PARALLELISM (e.g. the set of elements 1304 defined by letters (l,m,n)); and the next row width counter $w_1$ is set to X. For example, if 16 elements can be sent together (e.g. XBAR_PARALLELISM=16) and there are only 8 elements remaining in the current row, then those 8 elements are transmitted along with the first 8 elements in the next row. Once a set of elements has been transmitted (and optionally the next row width counter has been updated) the method 1400 proceeds to step 1416.

At step 1416, after a set of elements has been transmitted (e.g. at step 1406, 1410 or 1412) then it is determined whether there is another plane in the tensor (e.g. is c<(C−1)?). If it is determined that there is another plane in the tensor 1300 then the method 1400 proceeds to step 1418 where the plane counter value is incremented by 1 (e.g. c=c+1) to move to the next plane, and the method 1400 proceeds back to steps 1404-1414 where a set of elements from the next plane is transmitted. If, however, it is determined that there are no more planes in the tensor 1400, indicating that all of the elements at certain width positions have been transmitted for all planes, the method 1400 proceeds to step 1420.

At step 1420, it is determined whether there are any more elements in the current row that have not yet been transmitted (e.g. is w+(XBAR_PARALLELISM−1)<W?). If it is determined that that are more elements in the current row, then the method 1400 proceeds to step 1422 where the counters are adjusted to start transmitting values from the next set of width positions of the first plane. This may comprise incrementing the width position counter by XBAR_PARALLELISM (i.e. w=w+XBAR_PARALLELISM) and setting the plane counter back to zero (i.e. c=0). If, however, it is determined that there are no more elements in the current row, indicating that the same row for all planes has been transmitted, the method 1400 proceeds to step 1424.

At step 1424, once it has been determined that a whole row of elements of the tensor 1300 for all planes/channels have been transmitted, it is determined whether the tensor 1300 has more elements in the height dimension (e.g. is (H−1)>h? or is there another row?). If it is determined that the tensor 1300 has more elements in the height (h) dimension (i.e. there is another row), then the method 1400 proceeds to step 1426. If, however, it has been determined that the tensor 1300 does not have any more elements in the height dimension (i.e. there are no more rows) then the method 1400 ends.

At step 1426, the counters are adjusted to start transmitting values from the next row of the first plane. This may comprise incrementing the height counter value h by 1 (e.g. h=h+1) to the next row, setting the width counter value to the next row width counter value (e.g. w=$w_1$) (to start at the first elements in the row that have not already been sent) and setting the plane counter to 0 (e.g. c=0) to start at the first plane.

It can be seen from FIGS. 13 and 14 that the rasterized front end processing order is the same as the rasterized front end processing order described with respect to FIGS. 5-6 except when the end of a row is reached. In the front end processing order of FIGS. 5-6 only elements in the same row are transmitted together (e.g. in the same transaction or same set of elements). Accordingly, even if there are fewer elements left in the row than can be transmitted together (e.g. in the same transaction or same set of elements) only those elements are transmitted. In contrast, in the rasterized front end processing order of FIGS. 13 and 14 elements in different rows can be transmitted together (e.g. in the same transaction or same set of elements). So if there are fewer elements left in a row than can be transmitted together, those elements are transmitted together with elements from the next row (if there is another row).

In some cases, the tensors passed through the crossbar 320 in a hardware pass may be in front end processing order unless the pooling processing unit is active in the hardware pass. Specifically, the pooling processing unit may be configured to output tensors in the back end processing order. In such cases, if the convolution processing unit 302 processes the data after the pooling processing unit, the convolution processing unit 302 may be able to convert the output back to front end processing order.

Table 6 shows an example of the processing orders which may be supported by the units of the NNA 300 of FIG. 3. It will be evident that this is an example only. In other examples, one or more of the units of the NNA 300 that support the front end processing order may also support the rasterized front end processing order.

TABLE 6

| Unit | Input Tensor Processing Orders Supported | Output Tensor Processing Orders Supported |
|---|---|---|
| Input Buffer | Front End Back End | Front End |
| Convolution Processing Unit | — | Front End |
| Activation Processing Unit | Front End Back End | Front End Back End |
| Element-Wise Operations Processing Unit | Front End Back End | Front End Back End |
| Secondary Data Input Unit | — | Front End |
| Secondary Data Rx | Front End | — |
| Normalisation Processing Unit | Front End | — |
| Pooling Processing Unit | — | Back End |
| Tensel Rescale Processing Unit-A | Front End Back End | Front End Back End |
| Tensel Rescale Processing Unit-B | Front End Back End | Front End Back End |
| Interleave Processing Unit | Front End Back End | — |

Reference is now made to FIG. 15 which illustrates an example implementation of the convolution processing unit 302 of FIG. 3. In this example, the convolution processing unit 302 comprises a plurality of convolution engines 1502, a plurality of accumulators 1504 and an accumulation buffer 1506.

Each convolution engine 1502 comprises hardware logic configured to receive a set of weights $\{W_1, W_2 \ldots, W_8\}$ that represent all or a portion of a filter, and a set of input data values $\{D_1, D_2, \ldots, D_8\}$ that represent all or a portion of a window of the input data, and perform a multiply-accumulate calculation on the received weights and input data values. In some examples, as shown in FIG. 16, each convolution engine 1502 may comprise a plurality of multipliers 1602, each of which is configured to multiple a weight $(W_i)$ and a corresponding input data value $(D_i)$ to produce a multiplication output value. The multipliers 1602 are followed by a plurality of adders 1604 that form an adder tree to calculate the sum of the multiplication outputs. In the example of FIG. 16 the convolution engine 1502 comprises eight multipliers 1602, but in other examples there may be more or fewer multipliers. For example, in some cases there may be 128 multipliers. Generally, if there are Z multipliers the adder tree comprises Z−1 adders. The example convolution processing unit 302 of FIG. 15 comprises four convolution engines 1502, however, it will be evident to a person of skill in the art that this is an example only and there may be only one convolution engine, there may be two convolution engines, or there may be more than two convolution engines.

Since it may take more than one hardware pass of the convolution engines 1502 to generate a complete filter result (e.g. because a convolution engine may only receive and process a portion of the weights of a filter and/or a portion of the input data values of a window in a cycle), the convolution processing unit 302 may comprise a plurality of accumulators 1504. A pass of the convolution engines comprises receiving a set of weights and a set of input data values and performing a multiply-accumulate operation thereon. Each accumulator 1504 receives the output of one convolution engine 1502 and adds the output to previous convolution engine outputs that relates to the same filter. Since a convolution engine 1502 may not generate or produce outputs that relate to the same filter in consecutive cycles the partial results of one or more filters may be stored in an accumulation buffer 1506 and then the appropriate partial results may be provided to the accumulators 1504 each cycle by the accumulation buffer 1506.

As described above, in some cases the input buffer 324 may be implemented as a plurality of banks of memory. In these cases, there may be a multiplexor (not shown) for each convolution engine that is coupled to each of bank of the input buffer to allow the data stored in any of the banks to be selectively directed to any of the convolution engines.

Reference is now made to FIG. 17 which illustrates an example method 1700 for configuring a neural network accelerator with a configurable pipeline, such as the neural network accelerator 300 of FIG. 3, to process input data. The neural network accelerator comprises a plurality of hardware processing units and a crossbar coupled to each of the hardware processing units. The method 1700 may be implemented by a computing-based device such as, but not limited to, the computing-based device 1800 described below with respect to FIG. 18. For example, there may be a computer readable storage medium having stored thereon computer readable instructions that, when executed at a computing-based device, cause the computing-based device to perform the method 1700 of FIG. 17.

The method 1700 begins at block 1702 where a sequence of one or more neural network operations to be performed by the neural network accelerator on a set of input data is obtained. As described above, a software tool may divide the plurality of neural network operations in a neural network into a plurality of sequences of neural network operations which each can be processed in a hardware pass. Once the sequence of one or more neural network operations to be performed by the neural network accelerator on the input data is obtained the method 1700 proceeds to block 1704.

At block 1704, a set of hardware processing units from the plurality of hardware processing units is selected to perform the one or more neural network operations. The set of hardware processing units may comprise all of the plurality of hardware processing units or only a subset of the hardware processing units. The set of hardware processing units will be the active hardware processing units. The set of hardware processing units is selected based on the one or more neural network processing operations in the sequence. For example, if the sequence of neural network operations comprises a convolution operation and an activation operation, the set of hardware processing units may comprise a convolution processing unit to perform the convolution operation and an activation processing unit to perform the activation operation. In contrast, if the sequence of neural network operations comprises a pooling operation and a convolution operation then the set of hardware processing units may comprise a pooling processing unit and a convolution processing unit. Once the set of hardware processing units have been selected the method 1700 proceeds to block 1706.

At block 1706, an order of the selected set of hardware processing units is determined to perform the one or more neural network operations in accordance with the sequence. For example, if the sequence comprises a convolution operation followed by an activation operation and the set of hardware processing units comprises a convolution processing unit and an activation processing unit, then it may be determined that the activation processing unit is to follow the convolution processing unit in the order so that the neural network operations will be completed in the identified sequence. In some examples, there may be restrictions on which hardware processing units of the NNA can be connected to each other using the crossbar, as described above in more detail with reference to Tables 1 to 4. In such examples, the computing-based device implementing the method for configuring a neural network accelerator with a configurable pipeline may store a predefined set of restrictions in a memory and the method may read the predefined set of restrictions and determine the order of the selected set of hardware processing units such that the restrictions are not contravened, and only valid combinations of hardware processing units are to be connected using the crossbar. Once the order of the selected set of hardware processing units has been determined the method proceeds to block 1708.

At block 1708, the neural network accelerator is provided with control information that causes the crossbar of the neural network accelerator to form a pipeline of the selected set of hardware processing units in the determined order to process the input data. As described above, in some cases the control information may comprise information identifying the selected set of hardware processing units (e.g. the active processing units) and information identifying the determined order of the selected set of hardware processing units. In response to receiving this information, the crossbar may be configured to determine which input ports to connect to which output ports to implement the identified pipeline. In other cases, the control information may comprise explicit information identifying which input ports of the crossbar are to be connected to which output ports of the crossbar to form the pipeline. As described above, in some cases the neural network accelerator may have a register for each output port of the crossbar, and providing the control information to the neural network accelerator may comprise causing a value to be written to each register which identifies which input port of the crossbar is to be connected to the corresponding output port. Each input port may be allocated a number and the value written to a register may be the number of the input port to be connected to the corresponding output port. For example, if an output port is to be connected to input port 3, then the value 3 may be written to the register for that output port.

It will be evident to a person of skill in the art that the method 1700 is just an example and that in other examples one or more of the blocks of the method may be performed concurrently or as part of one step.

In some cases, prior to providing the control information to the neural network accelerator, the control information may first be verified (i.e. it may be determined that the control information is valid). In some cases, it may be determined that the control information is valid only if, when the output of a first hardware processing unit is to be the input to a second hardware processing unit, the control information indicates that the input port of the crossbar coupled to the output of the first hardware processing unit is to be connected or coupled to the output port of the crossbar coupled to the input of the second hardware processing unit. In further examples, the restrictions described above with reference to Tables 1 to 4 may also be used to verify that the control information is valid.

In some cases, the set of hardware processing units are selected such that the sequence of one or more neural network operations may be performed by using each of the hardware processing units in the set only once.

As described above, in some cases the crossbar may have a plurality of data input units. In these cases, the method of FIG. 17 may further comprise selecting one of the plurality of data input units to load the input data into the neural network accelerator based on one or more characteristics of the input and/or the pipeline to be implemented. For example, as described above, in some cases, if the convolution processing unit is not in the set of hardware processing units, or is not the first hardware processing unit in the order, it may be more efficient to load the input data into the neural network accelerator via the secondary data input unit. The control information may then be configured to include information identifying the selected data input unit.

As described above, in some cases, one or more of the hardware processing units may support a plurality of processing orders for sending and/or receiving tensors. In these cases, the method of FIG. 17 may further comprise selecting a processing order to be used by one or more hardware processing units of the set of hardware processing units for transmitting or receiving a tensor based on the pipeline. The control information may then be configured to include information identifying the selected processing order which causes the one or more processing units of the set to use the selected processing order for transmitting or receiving a tensor.

Test Data

Testing has shown that an NNA with a configurable hardware pipeline as described herein can improve the performance and/or power consumption of the NNA for certain NNs. An example NN in which an NNA with a configurable hardware pipeline has shown significant improvement in performance and/or power consumption is the Inception V3 neural network. Inception V3 comprises a number of inception cells which comprise several branches, and one branch comprises a pooling layer followed by a 1×1 convolution layer. In an NNA with a fixed hardware pipeline with a convolution processing unit subsequently followed (directly or indirectly) by a pooling processing unit, such a combination of layers would be performed in at least two hardware passes—in a first hardware pass the pooling layer would be performed or processed, and in a second hardware pass the convolution layer would be performed or processed. An NNA with a configurable hardware pipeline can perform such a combination of layers in a single hardware pass as it allows a pooling layer to be performed or processed prior to a convolution layer in the same hardware pass.

FIG. 18 illustrates various components of an exemplary computing-based device 1800 which may be implemented as any form of a computing and/or electronic device, and in which embodiments of the methods described herein may be implemented.

Computing-based device 1800 comprises one or more processors 1802 which may be microprocessors, controllers or any other suitable type of processors for processing computer executable instructions to control the operation of the device in order to configure a neural network accelerator to process input data. In some examples, for example where a system on a chip architecture is used, the processors 1802 may include one or more fixed function blocks (also referred to as accelerators) which implement a part of the method of configuring a neural network accelerator to process input data, in hardware (rather than software or firmware). Platform software comprising an operating system 1804 or any other suitable platform software may be provided at the computing-based device to enable application software to be executed on the device.

The computer executable instructions may be provided using any computer-readable media that is accessible by computing-based device 1800. Computer-readable media may include, for example, computer storage media such as memory 1806 and communications media. Computer storage media (i.e. non-transitory machine-readable media), such as memory 1806, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital 5 versatile disks (DVD) or other optical storage, magnetic cassettes, magnetic tape, magnetic disk storage or other magnetic storage devices, or any other non-transmission medium that can be used to store information for access by a computing device. In contrast, communication media may 10 embody computer readable instructions, data structures, program modules, or other data in a modulated data signal, such as a carrier wave, or other transport mechanism. As defined herein, computer storage media does not include communication media. Although the computer storage 15 media (i.e. non-transitory machine-readable media, e.g. memory 1806) is shown within the computing-based device 1800 it will be appreciated that the storage may be distributed or located remotely and accessed via a network or other communication link (e.g. using communication interface 20 1808).

The computing-based device 1800 also comprises an input/output controller 1810 arranged to output display information to a display device 1812 which may be separate from or integral to the computing-based device 1800. The 25 display information may provide a graphical user interface. The input/output controller 1810 is also arranged to receive and process input from one or more devices, such as a user input device 1814 (e.g. a mouse or a keyboard). This user input may be used to initiate configuration of a neural 30 network accelerator. In an embodiment the display device 1812 may also act as the user input device 1814 if it is a touch sensitive display device. The input/output controller 1810 may also output data to devices other than the display device, e.g. a locally connected printing device (not shown 35 in FIG. 18).

FIG. 19 shows a computer system in which the neural network accelerators described herein may be implemented. The computer system comprises a CPU 1902, a GPU 1904, a memory 1906 and other devices 1914, such as a display 40 1916, speakers 1918 and a camera 1920. A neural network accelerator 1924 (which may be any of the neural network accelerators described herein (e.g. neural network accelerator 300 of FIG. 3)) is implemented on the GPU 1904. The components of the computer system can communicate with 45 each other via a communications bus 1922. In other examples, the neural network accelerator 1924 may be implemented on the CPU 1902, or independently connected to the communications bus 1922.

The neural network accelerator 300, the crossbar 320, 50 convolution processing unit 302, and convolution engine 1502 of FIGS. 3, 4, 15 and 16 are shown as comprising a number of functional blocks. This is schematic only and is not intended to define a strict division between different logic elements of such entities. Each functional block may 55 be provided in any suitable manner. It is to be understood that intermediate values described herein as being formed by the neural network accelerator, crossbar, convolution processing unit or convolution engine need not be physically generated by that component at any point and may merely 60 represent logical values which conveniently describe the processing performed by the that component between its input and output.

The neural network accelerators, crossbars, convolution processing units, and convolution engines described herein 65 may be embodied in hardware on an integrated circuit. The neural network accelerators described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a neural network accelerator configured to perform any of the methods described herein, or to manufacture a neural network accelerator comprising any apparatus described herein. An integrated circuit definition dataset may be, for example, an integrated circuit description.

Therefore, there may be provided a method of manufacturing, at an integrated circuit manufacturing system, a neural network accelerator as described herein. Furthermore, there may be provided an integrated circuit definition dataset that, when processed in an integrated circuit manufacturing system, causes the method of manufacturing a neural network accelerator to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a neural network accelerator will now be described with respect to FIG. 20.

FIG. 20 shows an example of an integrated circuit (IC) manufacturing system 2002 which is configured to manufacture a neural network accelerator (or any component or unit thereof) as described in any of the examples herein. In particular, the IC manufacturing system 2002 comprises a layout processing system 2004 and an integrated circuit generation system 2006. The IC manufacturing system 2002 is configured to receive an IC definition dataset (e.g. defining a neural network accelerator (or any component or unit thereof) as described in any of the examples herein), process the IC definition dataset, and generate an IC according to the IC definition dataset (e.g. which embodies a neural network accelerator (or any component or unit thereof) as described in any of the examples herein). The processing of the IC definition dataset configures the IC manufacturing system 2002 to manufacture an integrated circuit embodying a neural network accelerator (or any component or unit thereof) as described in any of the examples herein.

The layout processing system 2004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2004 has determined the circuit layout it may output a circuit layout definition to the IC generation system 2006. A circuit layout definition may be, for example, a circuit layout description.

The IC generation system 2006 generates an IC according to the circuit layout definition, as is known in the art. For example, the IC generation system 2006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2006 may be in the form of computer-readable code which the IC generation system 2006 can use to form a suitable mask for use in generating an IC.

The different processes performed by the IC manufacturing system 2002 may be implemented all in one location, e.g. by one party. Alternatively, the IC manufacturing system 2002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a neural network accelerator (or any component or unit thereof) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 20 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 20, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A neural network accelerator comprising:
a plurality of hardware processing units, each hardware processing unit comprising hardware to accelerate performing one or more neural network operations on a tensor of data; and
a crossbar coupled to each hardware processing unit of the plurality of hardware processing units, the crossbar configured to selectively form, from a plurality of selectable pipelines, a pipeline from one or more of the hardware processing units of the plurality of hardware processing units to process input data to the neural network accelerator;
wherein at least one of the hardware processing units is configurable to transmit or receive a tensor via the crossbar in a selected processing order of a plurality of selectable processing orders, and the selected processing order is based on the pipeline formed by the crossbar.

2. The neural network accelerator of claim 1, wherein each tensor comprises a plurality of dimensions, and each processing order defines a sequence across the tensor dimensions in which data elements of the tensor are received or transmitted.

3. The neural network accelerator of claim 1, wherein each tensor comprises a width dimension, a height dimension and a channel dimension, and the plurality of selectable processing orders comprises a back end processing order in which data elements of the tensor are received or transmitted in width order, channel order and height order on a block basis, each block comprising elements of the tensor at a same height and a same width.

4. The neural network accelerator of claim 1, wherein each tensor comprises a width dimension, a height dimension and a channel dimension, and the plurality of selectable processing orders comprises a normalisation partial back end processing order in which data elements of the tensor are received or transmitted in a width order up to a maximum number of widths, channel order and height order on a block basis, each block comprising elements of the tensor at a same height and a same width.

5. The neural network accelerator of claim 1, wherein each tensor comprises a width dimension, a height dimension and a channel dimension, and the plurality of selectable processing orders comprises a front end processing order in which data elements of the tensor are received or transmitted in channel, width and height order on a block basis, each block comprising elements of the tensor in a same channel and at a same height.

6. The neural network accelerator of claim 1, wherein each tensor comprises a width dimension, a height dimension and a channel dimension, and the plurality of selectable processing orders comprises a rasterized front end processing order in which data elements of the tensor are received or transmitted in channel order, width order and height order on a block basis, each block comprising data elements of the tensor in a same channel and one or two height positions.

7. The neural network accelerator of claim 3, wherein each block has a maximum number of data elements, the maximum number of data elements being equal to a maximum number of data elements that can be received on an input port of the crossbar or transmitted on an output port of the crossbar at a same time.

8. The neural network accelerator of claim 7, wherein:
the plurality of hardware processing units comprises a convolution processing unit configured to accelerate a convolution operation between input data and weight data, the convolution processing unit comprising one or more convolution engines; and
the maximum number of data elements that can be received on an input port of the crossbar or transmitted on an output port of the crossbar at the same time is equal to the number of convolution engines.

9. The neural network accelerator of claim 1, wherein:
the neural network accelerator is configured to process a neural network in a plurality of hardware passes of the neural network accelerator, wherein, in a hardware pass of the neural network accelerator, the neural network accelerator is configured to load input data into the neural network accelerator and process the input data via a pipeline of the plurality of selectable pipelines; and
the crossbar is configured to receive, in a hardware pass, information identifying which pipeline of the plurality of selectable pipelines is to be formed in that hardware pass and information identifying the selected processing order for the at least one hardware processing unit.

10. The neural network accelerator of claim 9, wherein the crossbar comprises a plurality of input ports and a plurality of output ports, and the information identifying which pipeline of the plurality of selectable pipelines is to be formed in a hardware pass identifies which input ports of the crossbar are to be connected to which output ports of the crossbar.

11. The neural network accelerator of claim 9, wherein:
the crossbar comprises a plurality of input ports and a plurality of output ports,
the information identifying which pipeline of the plurality of pipelines is to be formed in a hardware pass identifies the hardware processing units of the plurality of hardware processing units forming the pipeline and the order of those hardware processing units in the pipeline, and
the crossbar is configured to dynamically determine which input ports of the crossbar are to be connected to which output ports of the crossbar based on that information.

12. The neural network accelerator of claim 1, further comprising a data input unit configurable to receive the input data to the neural network accelerator and output the received input data to an output port of the data input unit; wherein the output port of the data input unit is coupled to the crossbar and the crossbar is configured to selectively connect the output port of the data input unit to an input port of a hardware processing unit of the plurality of the hardware processing units.

13. The neural network accelerator of claim 12, wherein a second output port of the data input unit is coupled to an input port of the convolution processing unit, and the data input unit configured to selectively output received data to one of the output port of the data input unit and the second output port of the data input unit.

14. The neural network accelerator of claim 12, further comprising a second data input unit configurable to receive the input data to the neural network accelerator and output the received input data to an output port of the second input data unit; wherein the output port of the second data input unit is coupled to the crossbar and the crossbar is configured to selectively connect the output port of the second data input unit to an input port of a hardware processing unit of one of the plurality of hardware processing units.

15. The neural network accelerator of claim 14, wherein the plurality of hardware processing units comprises an element-wise operations processing unit configured to accelerate performing one or more element-wise operations on a set of data, and the element-wise operations processing unit is configurable to perform the one or more element-wise operations using secondary input data; and the second data input unit is configurable to receive one of the input data to the neural network accelerator and the secondary input data.

16. The neural network accelerator of claim 1, wherein the plurality of hardware processing units comprises an activation processing unit configured to accelerate applying an activation function to data, and at least one of the hardware processing units of the plurality of hardware processing units, other than the activation processing unit, comprises logic configured to apply an activation function to data generated by that hardware processing unit prior to outputting the generated data.

17. The neural network accelerator of claim 1, wherein the plurality of hardware processing units comprises a plurality of tensel rescale processing units, each tensel rescale processing unit configurable to receive a tensor comprising one or more channels, and quantise the received tensor on a per tensor or a per channel basis to an affine fixed point number format.

18. The neural network accelerator of claim 1, wherein:

the crossbar comprises a plurality of input ports and a plurality of output ports and the crossbar is configured to form the pipeline by connecting each of one or more input ports of the plurality of input ports of the crossbar to an output port of the plurality of output ports of the crossbar;

at least one input port of the plurality of input ports of the crossbar is configured to receive data elements with a first maximum bit width and a least one output port of the plurality of output ports of the crossbar is configured to output data elements with a second, different, maximum bit width; and the crossbar is configured to dynamically perform a bit width conversion on received data elements when the one of the at least one input ports of the crossbar with the first maximum bit width is connected to one of the at least one output ports of the crossbar with the second maximum bit width.

19. The neural network accelerator of claim 1, wherein the crossbar comprises a plurality of input ports, a plurality of output ports, and a plurality of multiplexors that selectively connect the input ports of the crossbar to the output ports of the crossbar.

20. A non-transitory computer readable storage medium having stored thereon a computer readable dataset description of the neural network accelerator as set forth in claim 1 that, when processed in an integrated circuit manufacturing system, causes the integrated circuit manufacturing system to manufacture an integrated circuit embodying the neural network accelerator.

* * * * *